US012646327B2

(12) United States Patent
Xu

(10) Patent No.: US 12,646,327 B2
(45) Date of Patent: Jun. 2, 2026

(54) MANAGEMENT METHOD, APPARATUS AND SYSTEM FOR EPIDEMIC DETECTION, ELECTRONIC DEVICE, AND STORAGE MEDIUM

(71) Applicant: BOE TECHNOLOGY GROUP CO., LTD., Beijing (CN)

(72) Inventor: Jingtao Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 172 days.

(21) Appl. No.: 18/579,986

(22) PCT Filed: Nov. 15, 2022

(86) PCT No.: PCT/CN2022/132078
§ 371 (c)(1),
(2) Date: Jan. 17, 2024

(87) PCT Pub. No.: WO2024/103264
PCT Pub. Date: May 23, 2024

(65) Prior Publication Data
US 2025/0086973 A1      Mar. 13, 2025

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/44* (2022.01); *G06V 40/166* (2022.01);
(Continued)

(58) Field of Classification Search
CPC ...... G06V 20/44; G06V 20/52; G06V 40/166; G06V 40/171; G06V 40/28; G08B 21/245; G08B 3/10; G06F 18/00; G06Q 10/06
(Continued)

(56) References Cited

U.S. PATENT DOCUMENTS

| | | | | |
|---|---|---|---|---|
| 12,020,193 | B1 * | 6/2024 | Penfield ................. | G06V 20/52 |
| 2016/0042635 | A1 * | 2/2016 | Rosebraugh ....... | G09B 19/0076 |
| | | | | 340/573.1 |
| 2017/0344833 | A1 * | 11/2017 | Ahlberg ................. | G06V 20/52 |
| 2021/0256835 | A1 * | 8/2021 | Ranasinghe ........... | H04N 23/90 |

(Continued)

FOREIGN PATENT DOCUMENTS

| | | |
|---|---|---|
| CN | 104182726 A | 12/2014 |
| CN | 108932758 A | 12/2018 |

(Continued)

OTHER PUBLICATIONS

International Search Report (with English translation) and Written Opinion received in corresponding PCT Application No. PCT/CN2022/132078, dated Jun. 14, 2023, 8 pages.

*Primary Examiner* — William C Vaughn, Jr.
*Assistant Examiner* — Astewaye Gettu Zewede
(74) *Attorney, Agent, or Firm* — Dority & Manning, P.A.

(57)      ABSTRACT
A management method for epidemic detection includes: obtaining a monitoring video captured in real time at an epidemic detection site; in response to monitoring that an update of persons to be sampled occurs, detecting whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently; and in response to detecting that the staff person does not
(Continued)

perform the disinfection operation, issuing first warning information.

19 Claims, 8 Drawing Sheets

(51) Int. Cl.

| | | |
|---|---|---|
| *G06V 40/16* | (2022.01) | |
| *G06V 40/20* | (2022.01) | |
| *G08B 3/10* | (2006.01) | |
| *G08B 21/24* | (2006.01) | |

(52) U.S. Cl.
CPC ............ *G06V 40/171* (2022.01); *G06V 40/28* (2022.01); *G08B 3/10* (2013.01); *G08B 21/245* (2013.01)

(58) Field of Classification Search
USPC .......................................................... 348/77
See application file for complete search history.

(56) References Cited

U.S. PATENT DOCUMENTS

| | | | |
|---|---|---|---|
| 2021/0357649 A1* | 11/2021 | Adam .................. G06V 40/171 |
| 2022/0300727 A1 | 9/2022 | Ehrlich | |
| 2023/0267735 A1* | 8/2023 | Fu ........................... G06T 7/248 |
| | | | 382/103 |

FOREIGN PATENT DOCUMENTS

| | | | | | |
|---|---|---|---|---|---|
| CN | 109858338 A | | 6/2019 | | |
| CN | 110688901 A | | 1/2020 | | |
| CN | 111666821 A | | 9/2020 | | |
| CN | 111723777 A | | 9/2020 | | |
| CN | 112232279 A | | 1/2021 | | |
| CN | 112992372 A | | 6/2021 | | |
| CN | 113033328 A | | 6/2021 | | |
| CN | 114141370 A | | 3/2022 | | |
| CN | 114241394 A | | 3/2022 | | |
| CN | 114418388 A | | 4/2022 | | |
| CN | 114444895 A | | 5/2022 | | |
| CN | 115105735 A | * | 9/2022 | ............. | A61L 9/145 |
| WO | WO-2009066994 A2 | * | 5/2009 | ............. | G06V 20/52 |

* cited by examiner

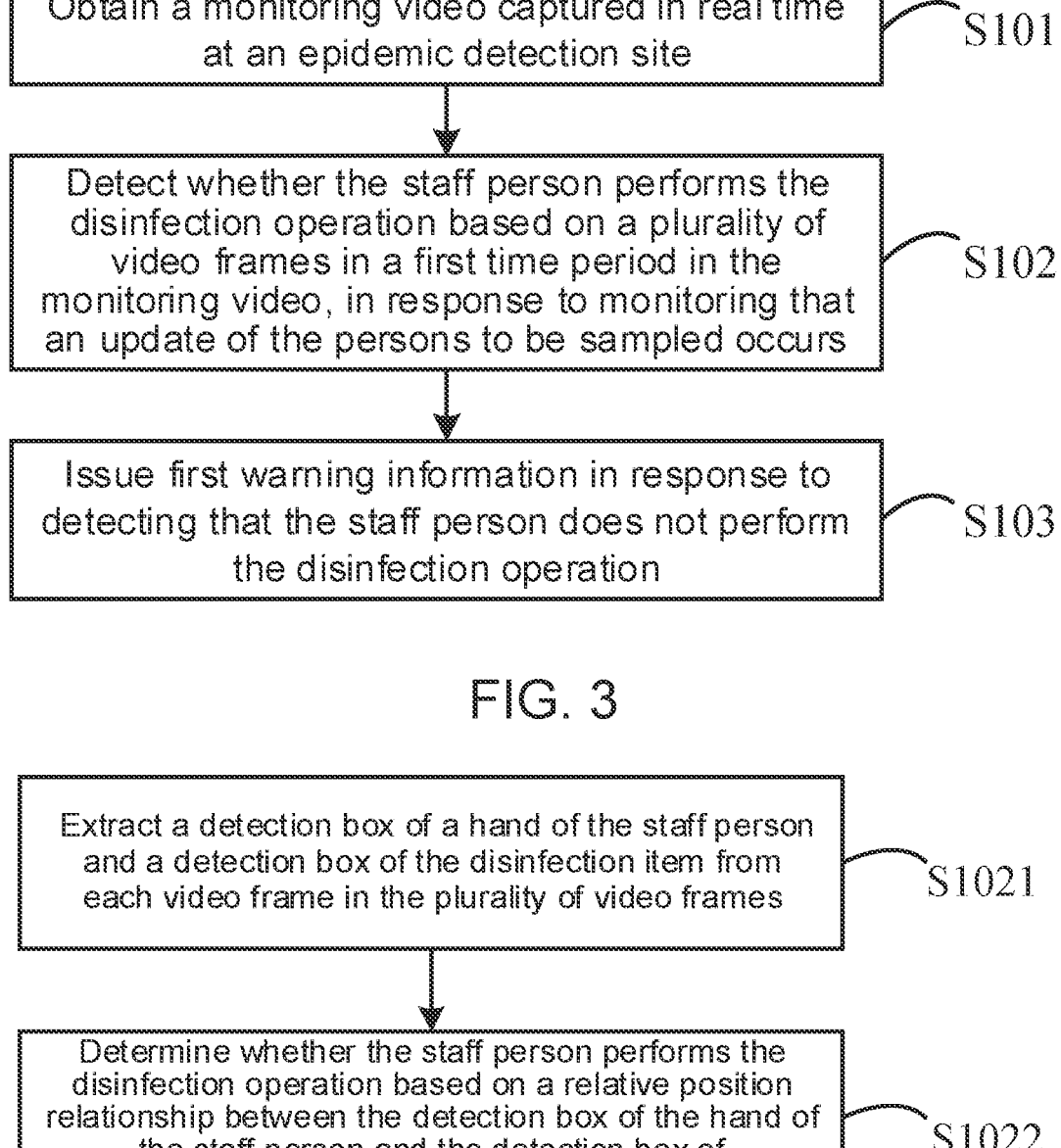

Obtain a monitoring video captured in real time at an epidemic detection site — S101

Detect whether the staff person performs the disinfection operation based on a plurality of video frames in a first time period in the monitoring video, in response to monitoring that an update of the persons to be sampled occurs — S102

Issue first warning information in response to detecting that the staff person does not perform the disinfection operation — S103

FIG. 3

Extract a detection box of a hand of the staff person and a detection box of the disinfection item from each video frame in the plurality of video frames — S1021

Determine whether the staff person performs the disinfection operation based on a relative position relationship between the detection box of the hand of the staff person and the detection box of the disinfection item — S1022

FIG. 4

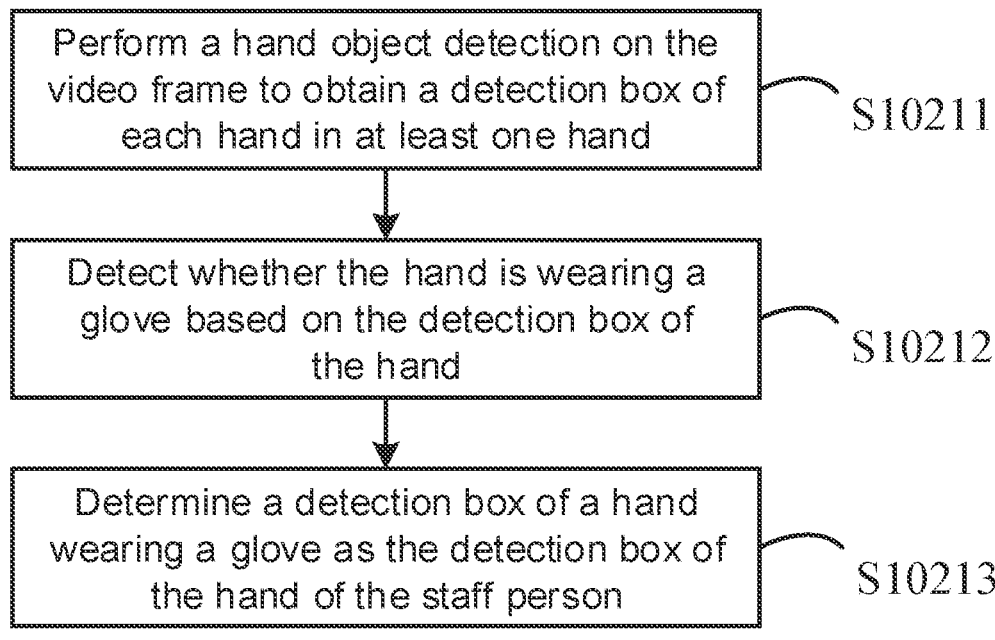

Perform a hand object detection on the video frame to obtain a detection box of each hand in at least one hand — S10211

Detect whether the hand is wearing a glove based on the detection box of the hand — S10212

Determine a detection box of a hand wearing a glove as the detection box of the hand of the staff person — S10213

FIG. 5

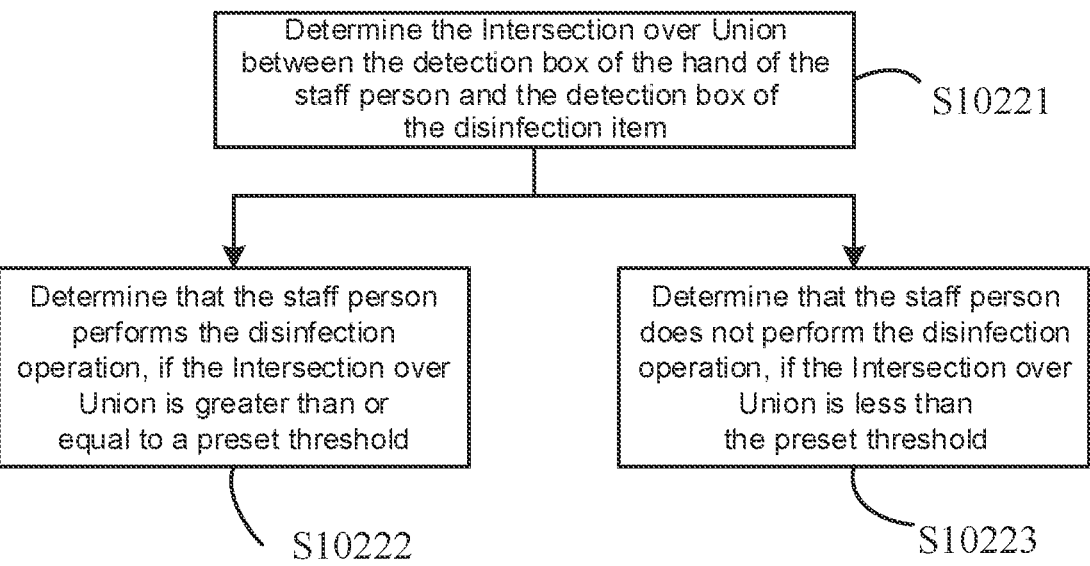

Determine the Intersection over Union between the detection box of the hand of the staff person and the detection box of the disinfection item — S10221

Determine that the staff person performs the disinfection operation, if the Intersection over Union is greater than or equal to a preset threshold — S10222

Determine that the staff person does not perform the disinfection operation, if the Intersection over Union is less than the preset threshold — S10223

FIG. 6

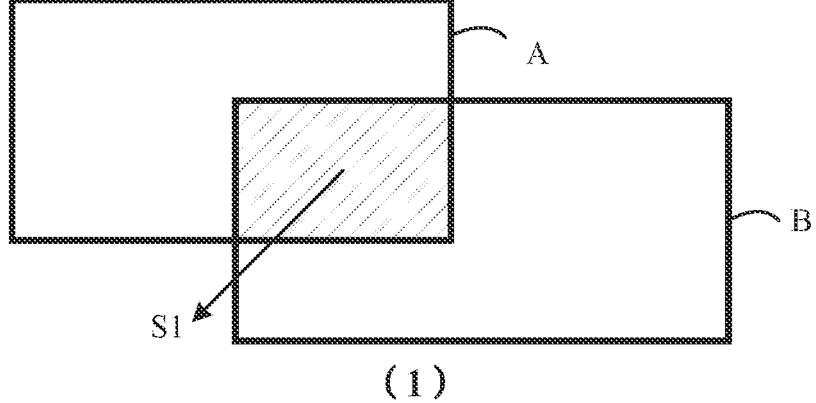
( 1 )
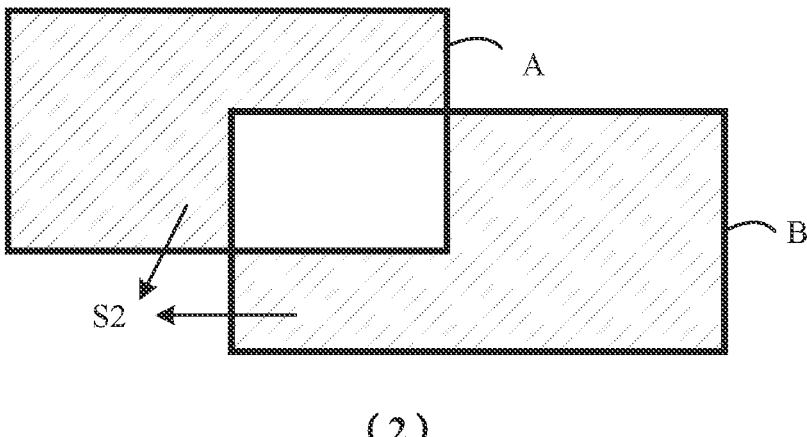
( 2 )
FIG. 7

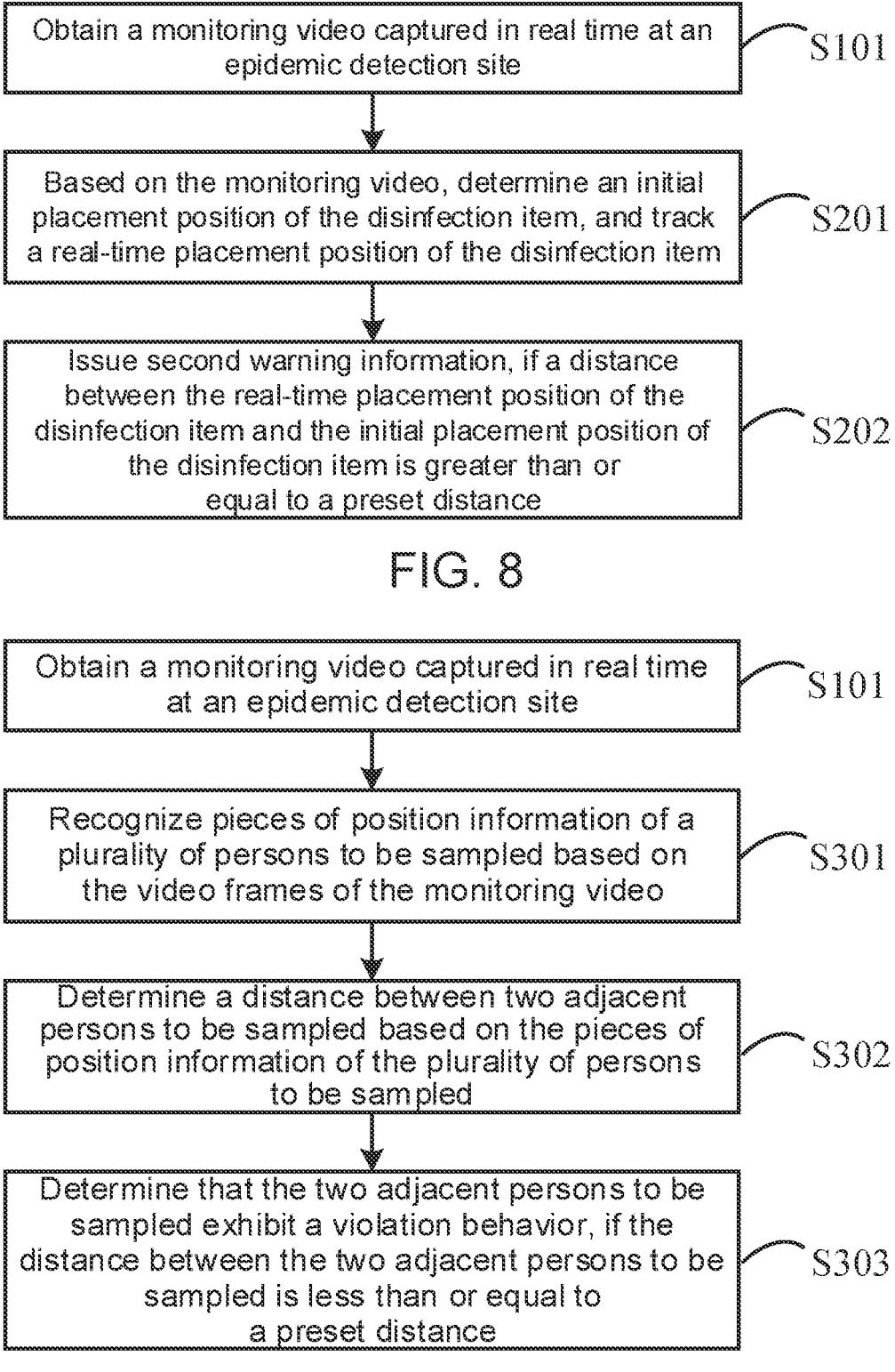

Obtain a monitoring video captured in real time at an epidemic detection site — S101

Based on the monitoring video, determine an initial placement position of the disinfection item, and track a real-time placement position of the disinfection item — S201

Issue second warning information, if a distance between the real-time placement position of the disinfection item and the initial placement position of the disinfection item is greater than or equal to a preset distance — S202

FIG. 8

Obtain a monitoring video captured in real time at an epidemic detection site — S101

Recognize pieces of position information of a plurality of persons to be sampled based on the video frames of the monitoring video — S301

Determine a distance between two adjacent persons to be sampled based on the pieces of position information of the plurality of persons to be sampled — S302

Determine that the two adjacent persons to be sampled exhibit a violation behavior, if the distance between the two adjacent persons to be sampled is less than or equal to a preset distance — S303

FIG. 9

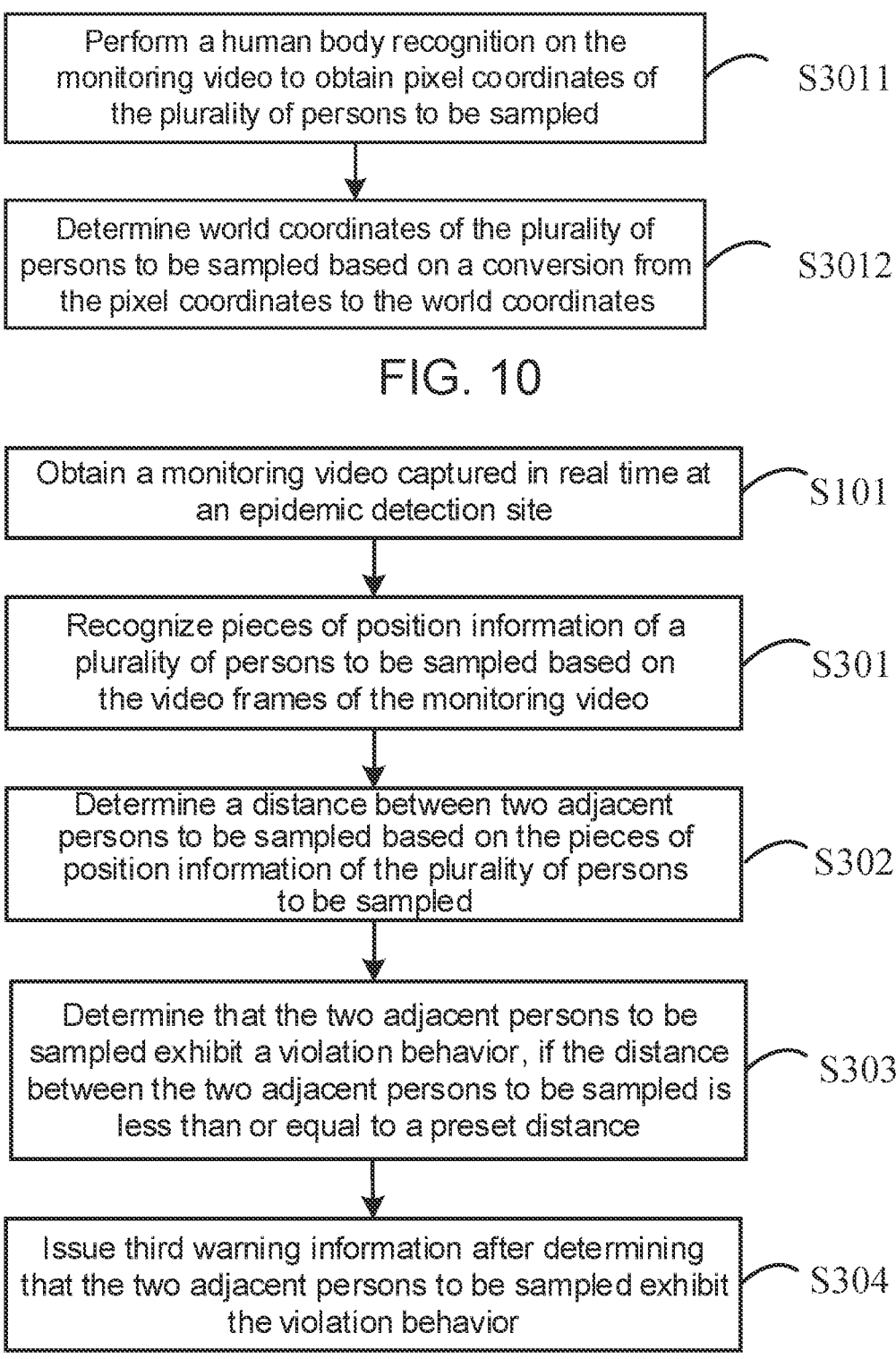

Perform a human body recognition on the monitoring video to obtain pixel coordinates of the plurality of persons to be sampled — S3011

Determine world coordinates of the plurality of persons to be sampled based on a conversion from the pixel coordinates to the world coordinates — S3012

FIG. 10

Obtain a monitoring video captured in real time at an epidemic detection site — S101

Recognize pieces of position information of a plurality of persons to be sampled based on the video frames of the monitoring video — S301

Determine a distance between two adjacent persons to be sampled based on the pieces of position information of the plurality of persons to be sampled — S302

Determine that the two adjacent persons to be sampled exhibit a violation behavior, if the distance between the two adjacent persons to be sampled is less than or equal to a preset distance — S303

Issue third warning information after determining that the two adjacent persons to be sampled exhibit the violation behavior — S304

FIG. 11

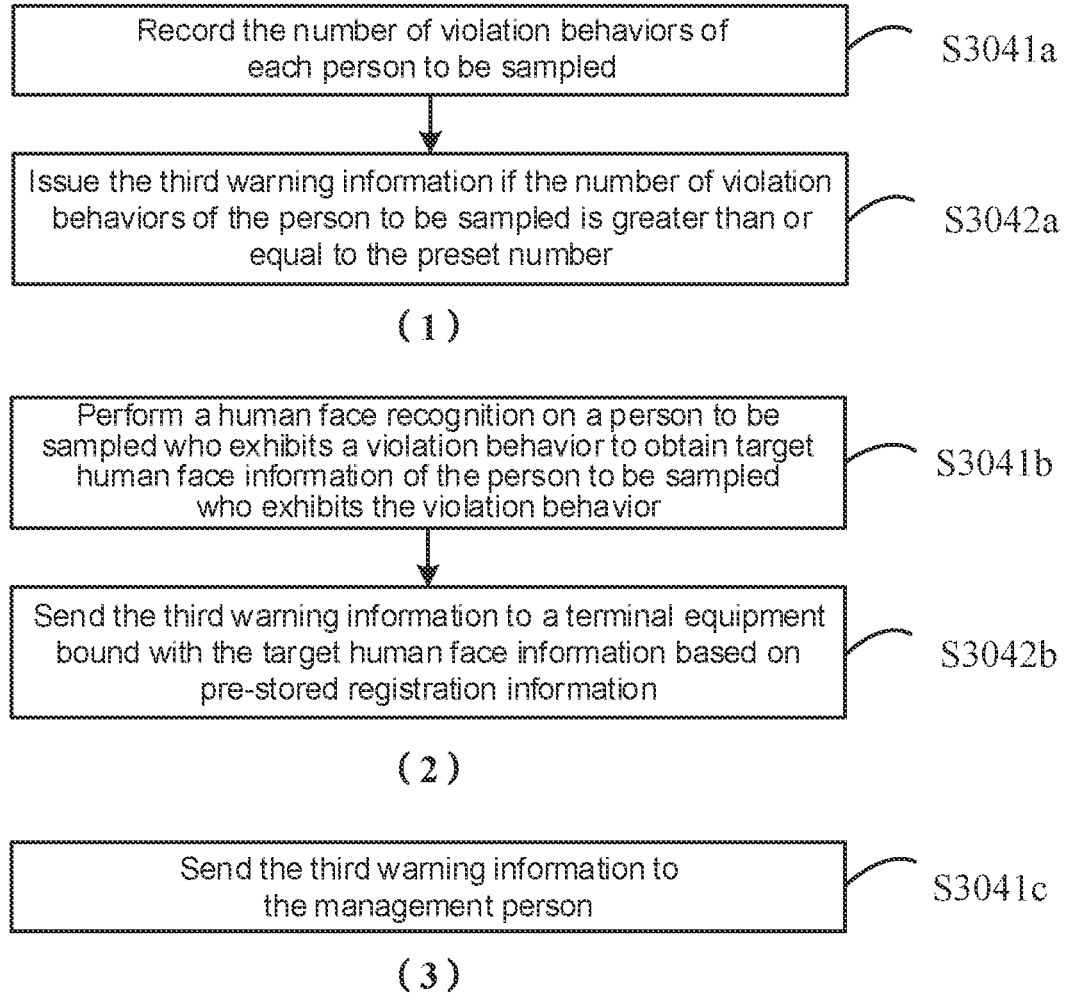

Record the number of violation behaviors of each person to be sampled    S3041a

Issue the third warning information if the number of violation behaviors of the person to be sampled is greater than or equal to the preset number    S3042a ( 1 )

Perform a human face recognition on a person to be sampled who exhibits a violation behavior to obtain target human face information of the person to be sampled who exhibits the violation behavior    S3041b Send the third warning information to a terminal equipment bound with the target human face information based on pre-stored registration information    S3042b ( 2 )

Send the third warning information to the management person    S3041c ( 3 )

FIG. 12

MANAGEMENT METHOD, APPARATUS AND SYSTEM FOR EPIDEMIC DETECTION, ELECTRONIC DEVICE, AND STORAGE MEDIUM

CROSS-REFERENCE TO RELATED APPLICATION

This application is a national phase entry under 35 USC 371 of International Patent Application No. PCT/CN2022/132078 filed on Nov. 15, 2022, which is incorporated herein by reference in its entirety.

TECHNICAL FIELD

The present disclosure relates to the field of information processing technologies, and in particular, to a management method, apparatus and system for epidemic detection, an electronic device, and a storage medium.

BACKGROUND

An epidemic is an infectious disease that can infect multitudes of people. When an epidemic occurs, it may pose a threat to people's life, work, physical health and even life safety, and affect economic and social development.

Therefore, once a highly contagious epidemic breaks out, a series of epidemic prevention and control measures need to be taken to avoid causing multitudes of people to be infected. However, the current epidemic prevention and control measures are still at the stage of manual investigation and manual maintenance, which will lead to a high risk of cross-infection and a low efficiency of epidemic prevention and control.

SUMMARY

In an aspect, a management method for epidemic detection is provided. The management method for epidemic detection includes: obtaining a monitoring video captured in real time at an epidemic detection site; in response to monitoring that an update of persons to be sampled occurs, detecting whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently; and in response to detecting that the staff person does not perform the disinfection operation, issuing first warning information.

In some embodiments, detecting whether the staff person performs the disinfection operation based on the plurality of video frames in the first time period in the monitoring video, includes: for each video frame in the plurality of video frames, extracting a detection box of a hand of the staff person and a detection box of a disinfection item from the video frame; and determining whether the staff person performs the disinfection operation based on a relative position relationship between the detection box of the hand of the staff person and the detection box of the disinfection item.

In some embodiments, determining whether the staff person performs the disinfection operation based on the relative position relationship between the detection box of the hand of the staff person and the detection box of the disinfection item, includes: determining an Intersection over Union between the detection box of the hand of the staff person and the detection box of the disinfection item; if the Intersection over Union is greater than or equal to a preset threshold, determining that the staff person performs the disinfection operation; and if the Intersection over Union is less than the preset threshold, determining that the staff person does not perform the disinfection operation.

In some embodiments, extracting the detection box of the hand of the staff person from the video frame, includes: performing a hand object detection on the video frame to obtain a detection box of each hand in at least one hand; detecting whether the hand is wearing a glove based on the detection box of the hand; and determining a detection box of a hand wearing a glove as the detection box of the hand of the staff person.

In some embodiments, detecting whether the hand is wearing the glove based on the detection box of the hand, includes: extracting an image block corresponding to the hand from the video frame based on the detection box of the hand; and inputting the image block corresponding to the hand into a glove recognition model to obtain a recognition result output by the glove recognition model, the recognition result being used to indicate whether the hand is wearing the glove.

In some embodiments, the first warning information includes at least one of identity information of the staff person, violation behavior information of the staff person, or work location information of the staff person.

In some embodiments, issuing the first warning information, includes: playing the first warning information through a loudspeaker; or sending the first warning information to a terminal equipment of a management person.

In some embodiments, the method further includes: based on the monitoring video, determining an initial placement position of the disinfection item, and tracking a real-time placement position of the disinfection item; and if a distance between the real-time placement position of the disinfection item and the initial placement position of the disinfection item is greater than or equal to a first preset distance, issuing second warning information.

In some embodiments, the method further includes: recognizing pieces of position information of a plurality of persons to be sampled based on the video frames of the monitoring video; determining a distance between two adjacent persons to be sampled based on the pieces of position information of the plurality of persons to be sampled; and if the distance between the two adjacent persons to be sampled is less than or equal to a second preset distance, determining that the two adjacent persons to be sampled exhibit a violation behavior.

In some embodiments, a piece of position information of each person to be sampled of the plurality of persons to be sampled is world coordinates of the person to be sampled; recognizing the pieces of position information of the plurality of persons to be sampled based on the video frames of the monitoring video, includes: performing a human body recognition on the monitoring video to obtain pixel coordinates of the plurality of persons to be sampled; and determining world coordinates of the plurality of persons to be sampled, based on a conversion from the pixel coordinates to the world coordinates.

In some embodiments, the method further includes: issuing third warning information, after determining that the two adjacent persons to be sampled exhibit the violation behavior.

In some embodiments, issuing the third warning information, includes: recording a number of violation behaviors of each person to be sampled; and issuing the third warning information, if the number of violation behaviors of the person to be sampled is greater than or equal to a preset number.

In some embodiments, issuing the third warning information, includes: performing a human face recognition on a person to be sampled with a violation behavior to obtain target human face information of the person to be sampled with the violation behavior; and sending the third warning information to a terminal equipment bound with the target human face information based on pre-stored registration information, the pre-stored registration information including pre-stored pieces of human face information and information of a terminal equipment bound with each of the pre-stored pieces of human face information.

In some embodiments, performing the human face recognition on the person to be sampled with the violation behavior to obtain the target human face information of the person to be sampled with the violation behavior, includes: performing the human face recognition on a human body detection box of the person to be sampled with the violation behavior, and extracting a human face region of the person to be sampled with the violation behavior; and performing a feature recognition on the human face region of the person to be sampled with the violation behavior to obtain the target human face information of the person to be sampled with the violation behavior, and saving the target human face information.

In some embodiments, issuing the third warning information, includes: sending the third warning information to the management person. The third warning information includes at least one of: human face information of a person to be sampled with the violation behavior, identity information of the person to be sampled with the violation behavior, violation behavior information of the person to be sampled with the violation behavior, or position information of the person to be sampled with the violation behavior.

In some embodiments, the method further includes: recording a number of violation behaviors of each person to be sampled; and issuing third warning information, if the number of violation behaviors of the person to be sampled is greater than or equal to a preset number.

In some embodiments, the method further includes: performing a human face recognition on the persons to be sampled based on the monitoring video, and extracting an image of a human face of each person to be sampled from the monitoring video based on a recognition result; performing a mask recognition based on the image of the human face of each person to be sampled to determine whether there exists a person to be sampled who is not wearing a mask in a monitoring region displayed by the monitoring video; and if there exists the person to be sampled not wearing the mask, issuing fourth warning information.

In some embodiments, the method further includes: obtaining a color image and an infrared image of a person to be sampled; based on the color image, performing a human face recognition on the person to be sampled, and locating a position of a forehead of the person to be sampled in the color image; based on a mapping relationship between the color image and the infrared image, locating a position of the forehead of the person to be sampled in the infrared image; based on an average value of pixels of the position of the forehead of the person to be sampled in the infrared image, determining a temperature of the forehead of the person to be sampled; and if it is detected that the temperature of the person to be sampled exceeds a temperature threshold, issuing fifth warning information.

In another aspect, a management apparatus for epidemic detection is provided. The management apparatus for epidemic detection includes: an obtaining module, a processing module and a warning module. The obtaining module is used to obtain a monitoring video captured in real time at an epidemic detection site. The processing module is used to in response to monitoring that an update of persons to be sampled occurs, detect whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently. The warning module is used to in response to detecting that the staff person does not perform the disinfection operation, issue first warning information.

In some embodiments, the processing module is used to: for each video frame in the plurality of video frames, extract a detection box of a hand of the staff person and a detection box of a disinfection item from the video frame; and determine whether the staff person performs the disinfection operation based on a relative position relationship between the detection box of the hand of the staff person and the detection box of the disinfection item.

In some embodiments, the processing module is used to: perform a hand object detection on the video frame to obtain a detection box of each hand in at least one hand; detect whether the hand is wearing a glove based on the detection box of the hand; and determine a detection box of a hand wearing a glove as the detection box of the hand of the staff person.

In some embodiments, the processing module is used to: extract an image block corresponding to the hand from the video frame based on the detection box of the hand; and input the image block corresponding to the hand into a glove recognition model to obtain a recognition result output by the glove recognition model, where the recognition result is used to indicate whether the hand is wearing the glove.

In some embodiments, the warning module is used to: play the first warning information through a loudspeaker; or send the first warning information to a terminal equipment of a management person, where the first warning information includes at least one of identity information of the staff person, violation behavior information of the staff person, work location information of the staff person.

In some embodiments, the processing module is further used to, based on the monitoring video, determine an initial placement position of the disinfection item, and track a real-time placement position of the disinfection item. The warning module is further used to, if a distance between the real-time placement position of the disinfection item and the initial placement position of the disinfection item is greater than or equal to a preset distance, issue second warning information.

In some embodiments, the processing module is further used to: recognize pieces of position information of a plurality of persons to be sampled based on the video frames of the monitoring video; determine a distance between two adjacent persons to be sampled based on the pieces of position information of the plurality of persons to be sampled; and if the distance between the two adjacent persons to be sampled is less than or equal to a preset distance, determine that the two adjacent persons to be sampled exhibit a violation behavior.

In some embodiments, position information of a person to be sampled is world coordinates of the person to be sampled. The processing module is used to: perform a human body recognition on the monitoring video to obtain pixel coordinates of the plurality of persons to be sampled; and determine world coordinates of the plurality of persons to be sampled, based on a conversion from the pixel coordinates to the world coordinates.

In some embodiments, the warning module is further used to issue third warning information, after determining that the two adjacent persons to be sampled exhibit the violation behavior.

In some embodiments, the processing module is further used to record a number of violation behaviors of each person to be sampled. The warning module is used to issue the third warning information, if the number of violation behaviors of the person to be sampled is greater than or equal to a preset number.

In some embodiments, the processing module is further used to: perform a human face recognition on a person to be sampled with a violation behavior to obtain target human face information of the person to be sampled with the violation behavior. The warning module is used to: send the third warning information to a terminal equipment bound with the target human face information based on pre-stored registration information, where the pre-stored registration information includes pre-stored pieces of human face information and information of a terminal equipment bound with each of the pre-stored pieces of human face information.

In some embodiments, the warning module is used to: send the third warning information to the management person, where the third warning information includes at least one of: human face information of a person to be sampled with the violation behavior, identity information of the person to be sampled with the violation behavior, violation behavior information of the person to be sampled with the violation behavior, or position information of the person to be sampled with the violation behavior.

In yet another aspect, a management system for epidemic detection is provided. The management system for epidemic detection includes a camera device, a processing device and warning device. The camera device is used to generate a monitoring video captured in real time at an epidemic detection site, and send data of the generated monitoring video to the processing device having a communication connection therewith. The processing device is used to: in response to monitoring that an update of persons to be sampled occurs, detect whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently. The warning device is used to, in response to detecting that the staff person does not perform the disinfection operation, issue first warning information.

In yet another aspect, an electronic device is provided. The electronic device includes a memory and a processor, and the memory and the processor are coupled; the memory is used to store computer program codes, and the computer program codes include computer instructions. The computer instructions, when executed by the processor, enable the electronic device to perform one or more steps in the management method for epidemic detection as described in any of the above embodiments.

In yet another aspect, a non-transitory computer-readable storage medium is provided. The non-transitory computer-readable storage medium stores computer program instructions that, when run on a computer (e.g., the electronic device), enable the computer to perform one or more steps in the management method for epidemic detection as described in any of the above embodiments.

In yet another aspect, a computer program product is provided. The computer program product includes computer program instructions that, when executed on a computer (e.g., the electronic device), enable the computer to perform one or more steps in the management method for epidemic detection as described in any of the above embodiments.

In yet another aspect, a computer program is provided. The computer program, when executed on a computer (e.g., the electronic device), enables the computer to perform one or more steps in the management method for epidemic detection as described in any of the above embodiments.

BRIEF DESCRIPTION OF THE DRAWINGS

In order to describe technical solutions in some embodiments of the present disclosure more clearly, the accompanying drawings to be used in some embodiments of the present disclosure will be introduced briefly; obviously, the accompanying drawings to be described below are merely some embodiments of the present disclosure, and a person of ordinary skill in the art can obtain other drawings according to those drawings. In addition, accompanying drawings in the following description may be regarded as schematic diagrams, and are not limitations on an actual size of a product, an actual process of a method and an actual timing of signals involved in the embodiments of the present disclosure.

FIG. 3 is a first flowchart of a management method for epidemic detection, in accordance with some embodiments;

FIG. 4 is a second flowchart of a management method for epidemic detection, in accordance with some embodiments;

FIG. 5 is a third flowchart of a management method for epidemic detection, in accordance with some embodiments;

FIG. 6 is a fourth flowchart of a management method for epidemic detection, in accordance with some embodiments;

FIG. 7 is a schematic diagram showing a possible situation of a ratio of Intersection over Union, in accordance with some embodiments;

FIG. 8 is a fifth flowchart of a management method for epidemic detection, in accordance with some embodiments;

FIG. 9 is a sixth flowchart of a management method for epidemic detection, in accordance with some embodiments;

FIG. 10 is a seventh flowchart of a management method for epidemic detection, in accordance with some embodiments;

FIG. 11 is an eighth flowchart of a management method for epidemic detection, in accordance with some embodiments;

FIG. 12 is a ninth flowchart of a management method for epidemic detection, in accordance with some embodiments;

DETAILED DESCRIPTION

Figure 1:
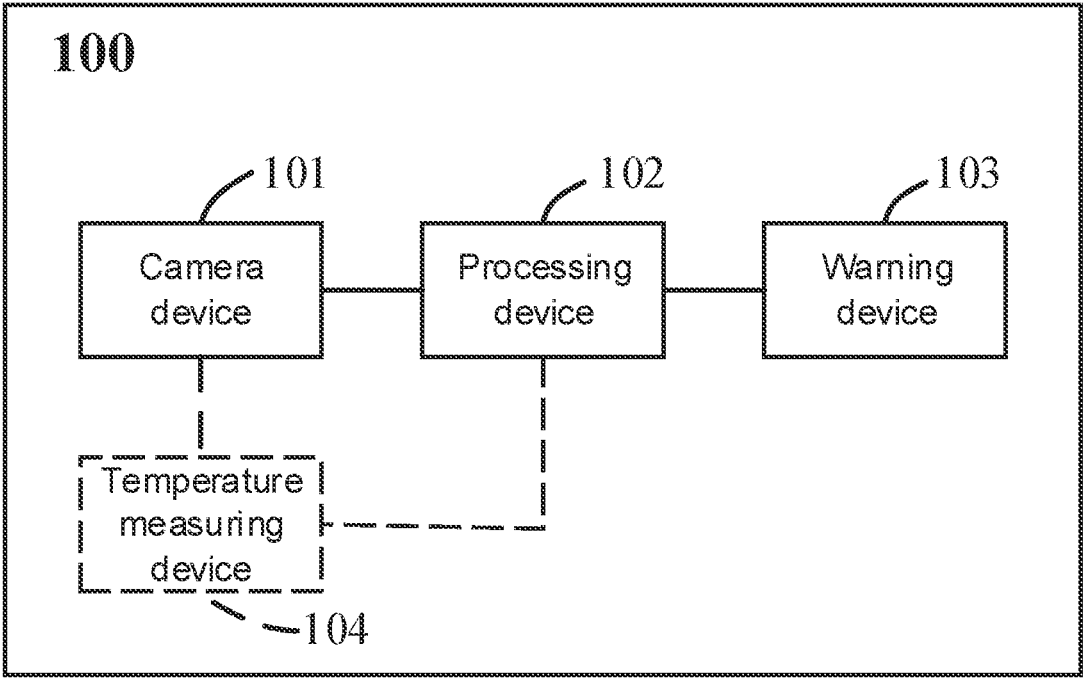
FIG. 1 is a block diagram of a management system for epidemic detection, in accordance with some embodiments.

The technical solutions in some embodiments of the present disclosure will be described clearly and completely with reference to the accompanying drawings; obviously, the described embodiments are merely some but not all the embodiments of the present disclosure. All other embodiments obtained on the basis of the embodiments of the present disclosure by a person of ordinary skill in the art shall be included in the protection scope of the present disclosure.

In will be noted that in the present disclosure, the words/phrases such as "exemplary" or "for example" are used to present an example, illustration, or explanation. Any embodiment or design solution described with "exemplary" or "for example" in the present disclosure is not necessarily to be construed as preferred or advantageous over other embodiments or design solutions. Rather, the use of the words/phrases such as "exemplary" or "for example" is intended to present relevant concepts in a specific manner.

Unless the context requires otherwise, throughout the description and claims, the term "comprise" and other forms thereof such as the third-person singular form "comprises" and the present participle form "comprising" are construed as an open and inclusive meaning, i.e., "included, but not limited to".

In addition, in the description of the present disclosure, unless otherwise specified, the symbol "/" means "or", for example, "A/B" may mean A or B. Herein, "and/or" is merely an association relationship for describing associated objects, which represents that there may be three kinds of relationships. For example. "A and/or B" may represent three situations that: A exists only, A and B exist simultaneously, and B exists only. In addition, "at least one" means one or more, and "a/the of plurality" means two or more.

As used herein, the term "if" is optionally construed as "when", "in a case where", "in response to determining" or "in response to detecting", depending on the context. Similarly, depending on the context, the phrase "if it is determined that" or "if [a stated condition or event] is detected" is optionally construed as "in a case where it is determined that", or "in response to determining that", or "in a case where [the stated condition or event] is detected" or "in response to detecting [the stated condition or event]".

In addition, the use of the phrase "based on" is meant to be open and inclusive, since a process, step, calculation or other action that is "based on" one or more of the stated conditions or values may, in practice, be based on additional conditions or values beyond those stated.

As mentioned in the background art, when an epidemic occurs, it may pose a threat to people's life, work, health and even life safety, and affect the economic development of a society. Therefore, once a highly contagious epidemic breaks out, a series of epidemic prevention and control measures need to be taken to avoid multitudes of infections. However, the current epidemic prevention and control measures are still in the stage of manual screening and manual maintenance, which will lead to low efficiency of epidemic prevention and control.

In light of this, embodiments of the present disclosure provide a management method for epidemic detection. The core idea of this method is to detect whether a staff person performs a disinfection operation after an update of persons to be sampled occurs through analyzing a monitoring video, and to give a warning if the staff person does not perform the disinfection operation. In this way, it may be ensured that the staff person will perform a disinfection operation after each sampling (such as nucleic acid sampling) of a person to be sampled, so as to prevent the staff person from sampling multiple persons to be sampled without performing disinfection operations, thereby reducing the risk of cross-infection and improving the efficiency of epidemic prevention and control.

It will be noted that the management method for epidemic detection provided by the embodiments of the present disclosure may be applied to nucleic acid sampling scenes, and may also be extended to other scenes that may require "a disinfection for each person", the present disclosure does not limit the specific application scenes of the management method for epidemic detection.

In order to facilitate the understanding of the solution, a nucleic acid sampling scene is taken as an example below, and a management system for epidemic detection that may be involved in the embodiments of the present disclosure is firstly introduced as a whole.

Refer to FIG. 1, FIG. 1 shows a management system 100 for epidemic detection, in accordance with some embodiments. Here, the management system 100 for epidemic detection includes: a camera device 101, a processing device 102, and a warning device 103. There exists a wired or wireless communication connection between the camera device 101 and the processing device 102, and there exists a wired or wireless communication connection between the processing device 102 and the warning device 103. In some embodiments, the management system 100 for epidemic detection may further include a temperature measuring device 104.

The camera device 101 includes at least one camera, used to capture and generate the monitoring video, and send data of the generated monitoring video to the processing device 102. In some embodiments, a monitoring region covered by the monitoring video may include a disinfection item. In some embodiments, the monitoring region covered by the monitoring video may include the persons to be sampled.

For ease of understanding, possible modes of configuring the monitoring region covered by the monitoring video captured by the camera device 101 are exemplarily given below.

In some embodiments, the camera device 101 may use a region centered on the disinfection item as the monitoring region.

In some embodiments, the camera device 101 may use a standing region of the persons to be sampled as the monitoring region.

In some embodiments, the camera device 101 may also use an entire region including the disinfection item and the persons to be sampled as the monitoring region.

It should be understood that the camera device 101 may be one camera, or may be a collection of a plurality of cameras. The embodiments of the present disclosure do not specifically limit the number of cameras included in the camera device 101. In addition, the monitoring region of the camera device 101 is only an example, and the monitoring region of the camera device 101 may also be other possible regions, as long as it enables the processing device 102 to realize corresponding analysis and detection functions subsequently, which is not specifically limited in the present disclosure.

The processing device 102 is used to receive the monitoring video captured by the camera device 101, and analyze and detect the monitoring video. In addition, the processing device 102 may further determine whether a warning is required according to the analysis and detection results, and notify the warning device 103 to give a corresponding warning if the warning is required.

In some embodiments, in a case where the monitoring video includes the disinfection item, the processing device

102 may recognize the disinfection item in the monitoring video, and analyze and detect a position of the disinfection item to determine whether the disinfection item has moved relative to an initial position; alternatively, the processing device 102 may recognize hands of the staff person and disinfection item in the monitoring video to determine whether the staff person performs the disinfection operation; alternatively, the processing device 102 may recognize hands of a non-staff person and the disinfection item in the monitoring video to determine whether the non-staff person touches the disinfection item. In some examples, the staff person is a medical worker for performing sampling operation.

In some embodiments, in a case where the monitoring video includes the persons to be sampled, the processing device 102 may perform a human body recognition (such as human body contour recognition and human body position recognition) on the monitoring video to determine whether a distance between the persons to be sampled is too small; if performing the human body position recognition, the processing device 102 may realize a conversion from image coordinates to world coordinates based on the monitoring video, and then determine a specific position of each person to be sampled. Alternatively, the processing device 102 may perform the human body recognition and/or human face recognition on the monitoring video to determine whether an update of the persons to be sampled occurs. Alternatively, the processing device 102 may perform the human body recognition and a mask wearing recognition on the monitoring video to determine whether a person to be sampled is wearing a mask. Alternatively, the processing device 102 may perform the human face recognition on the monitoring video to register human face information of a person to be sampled. It will be noted that the processing device 102 may also establish a connection (not shown in the figures) with a terminal equipment of a person to be sampled (e.g., a mobile phone of the person to be sampled) to obtain human face information of the person to be sampled sent by the terminal equipment; in addition, a registration of the human face information may also be realized through the terminal equipment of the person to be sampled, and only a manner of obtaining the registration of human face information of the person to be sampled via the monitoring video by the processing device 102 is shown here.

It should be understood that the processing device 102 may be any device with data processing functions, such as a computer equipment, a server, a chip system, a circuit or another discrete device, as long as the processing device 102 is capable of implementing the methods provided in the embodiments of the present disclosure and in possible implementations thereof, which is not specifically limited in the present disclosure.

The warning device 103 is used to give a corresponding warning according to the analysis result of the monitoring video by the processing device 102, for example, to issue warning information. In some embodiments, the warning device 103 may give the warning once the processing device 102 detects a risky behavior, and the risky behavior may include at least one of the following: that the distance between the persons to be sampled is too small, that a person to be sampled does not wear a mask, that human face information of a person to be sampled is not registered, that the staff person does not perform the disinfection operation after the update of the persons to be sampled occurs, that the disinfection item is moved, or that a non-staff person touches the disinfection item.

In some embodiments, the aforementioned warning device 103 may be a voice playing device or a display device. In some embodiments, the warning device 103 may play or display warning information in the form of voice, text, animation, or vibration. In addition, the aforementioned warning device 103 may also be a communication interface. For example, the warning device 103 may establish a communication connection with a terminal equipment (such as mobile phone or laptop computer) of a management person, the staff person or a person to be sampled, and then the warning device 103 may send the warning information to the terminal equipment of the management person, the staff person or the person to be sampled. It should be understood that the present disclosure does not specifically limit a sending form and/or sending object of the warning information.

It will be noted that the aforementioned camera device 101, processing device 102, and warning device 103 may be deployed independently or in an integrated manner. For example, the camera device 101 and the processing device 102 may be deployed in an integrated manner. As another example, the processing device 102 and the warning device 103 may be deployed in an integrated manner. As another example, the warning device 103 and the camera device 101 may be deployed in an integrated manner. As another example, the camera device 101, the processing device 102, and the warning device 103 may be deployed in an integrated manner. The present disclosure does not specifically limit this.

The temperature measuring device 104 is used to measure a body temperature of a person to be sampled. For example, the temperature measuring device may be an infrared temperature measuring gun, or an infrared imaging device, which is not specifically limited in the present disclosure. The temperature measurement device may be deployed independently, or integrated into one or more of the aforementioned camera device 101, processing device 102, or warning device 103, which is not limited in the present disclosure.

Although not shown in FIG. 1, the above management system 100 for epidemic detection may further include a storage device and/or a power supply device. In some embodiments, the storage device may store the data of the monitoring video captured by the camera device 101, store the analysis result of the processing device 102, store algorithm resources required by the processing device 102 for video analysis, or store the warning information of the warning device 103. The power supply device (such as a battery and a power management chip) may supply power to various components of the management system 100 for epidemic detection, so as to realize functions such as power consumption management of the management system 100 for epidemic detection.

Figure 2:
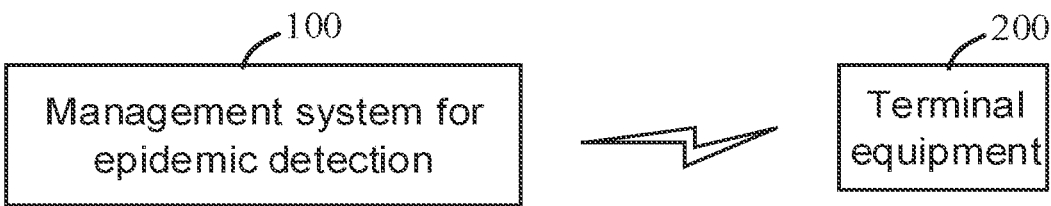
FIG. 2 is a diagram showing a scenario of an interaction of devices, in accordance with some embodiments.

In addition, embodiments of the present disclosure provide a scenario of an interaction of devices. Referring to FIG. 2, this scenario of an interaction of devices is used to realize the interaction between the management system 100 for epidemic detection and a terminal equipment 200.

For the management system 100 for epidemic detection, reference may be made to the above description of FIG. 1, which will not be repeated here. In some embodiments, the management system 100 for epidemic detection may send warning information to the terminal equipment. The warning information may include personnel information (such as identity information, position information, or human face information) with risky behavior; alternatively, the warning information may remind persons involved in the interaction scenario to pay attention to safety. In some embodiments, the management system 100 for epidemic detection may receive human face information of a person to be sampled sent by the terminal equipment, so as to register the human face information of the person to be sampled.

Accordingly, the terminal equipment 200 may receive the warning information sent by the management system 100 for epidemic detection; alternatively, the terminal equipment 200 may obtain human face information of the sampled person to be registered and send the human face information to the management system 100 for epidemic detection. In some embodiments, the terminal equipment 200 may be a terminal equipment of a person to be sampled, or a terminal equipment of the staff person, or a terminal equipment of the management person, or a public device (such as a screen or loudspeaker at a plaza) in the interaction scenario, which is not specifically limited in the embodiments of the present disclosure.

In some embodiments, the terminal equipment 200 may also be called a terminal, a user equipment (UE), a mobile station, a mobile terminal, or the like. The terminal equipment may be a mobile phone, a smart watch, a tablet computer, a computer with a wireless transceiver function, a virtual reality terminal equipment, an augmented reality terminal equipment, or the like. The embodiments of the present disclosure do not limit the specific device form used for the terminal equipment.

For ease of understanding, a management method for epidemic detection provided in the present disclosure will be specifically introduced below in conjunction with the accompanying drawings. It will be noted that this method may be implemented by the above management system 100 for epidemic detection, may also be implemented by the processing device in the management system for epidemic detection, and may also be implemented by any other hardware or software with processing functions, such as a chip system, circuits, servers, or computer equipment. The present disclosure is not limited to this.

FIG. 3 shows the management method for epidemic detection proposed in the embodiments of the present disclosure, which is applied in the field of information processing technology. The method shown in FIG. 3 will be specifically described below by taking an execution subject as a server as an example. As shown in FIG. 3, the management method for epidemic detection includes the following steps S101 to S103.

In S101, a monitoring video captured in real time at an epidemic detection site is obtained.

Here, the epidemic detection site is a scene where detection relevant to epidemic prevention and control is required.

In some embodiments, a connection is established between the server and a monitoring device (i.e., the aforementioned camera device 101), and the server obtains in real time a monitoring video composed of a plurality of video frames captured by the monitoring device in a continuous period of time.

In some other embodiments, a connection is established between the server and the storage device, the data of the monitoring video captured in real time by the monitoring device is stored in the storage device, and the server reads the data related to the monitoring video from the storage device, thereby obtaining the monitoring video captured in real time on the epidemic detection site.

In some embodiments, the monitoring region corresponding to the monitoring video includes at least one of a disinfection item (such as alcohol), a position region of a staff person, and a standing region of a person to be sampled, so that a corresponding detection and recognition may be performed based on the monitoring video subsequently. It should be understood that it is sufficient that the content included in the monitoring region enables the detection and recognition in related embodiments (for example, a detection and recognition of whether or not a disinfection operation is performed), and the embodiments of the present disclosure do not limit the specific content of the monitoring region.

In some embodiments, the monitoring video is a single monitoring video. For example, the monitoring region covered by the monitoring video may include the disinfection item, the position region of the staff person, and the standing region of the person to be sampled, and then a corresponding detection and recognition may be performed based on the single monitoring video to reduce the amount of computation.

In some other embodiments, the monitoring video is a collection of a plurality of monitoring videos. Exemplarily, the monitoring video may include a plurality of monitoring videos: a monitoring video with the disinfection item as the center of a monitoring region, a monitoring video with a standing region of all persons to be sampled as the center of a monitoring region, and a monitoring video with a standing region of a person sampled currently as the center of a monitoring region, and a monitoring video with the position region of the staff person as the center of a monitoring region, so that an accurate detection and recognition may be performed based on a respective monitoring video.

In some embodiments, after turning on a management function for epidemic detection, the server obtains the monitoring video captured in real time at the epidemic detection site, and the management function for epidemic detection is used to implement the management method for epidemic detection provided in the embodiments of the present disclosure.

In some embodiments, the server turns on the management function for epidemic detection by default.

In some other embodiments, the server turns on the management function for epidemic detection in response to receiving an instruction to turn on the management function for epidemic detection.

In S102, in response to monitoring that an update of the persons to be sampled occurs, it is detected whether the staff person performs the disinfection operation based on a plurality of video frames in a first time period in the monitoring video.

Here, the first time period is a time period between a moment when the update of the persons to be sampled is monitored last time and a moment when the update of the persons to be sampled is monitored currently.

In some embodiments, the update of the persons to be sampled occurring may be understood as that for every time the staff person finishes a sampling of a person to be sampled (for example, nucleic acid sampling), one update of the persons to be sampled occurs.

In some embodiments, the monitoring video includes the standing region of the person sampled currently. Furthermore, based on the monitoring video, a human face recognition is performed on the person sampled currently, and if the human face of the person sampled currently is detected to be changed, it is detected that an update of the persons to be sampled occurs. Alternatively, based on the monitoring video, a human body recognition is performed on the person sampled currently, and then the person sampled currently is tracked, if it is detected that the person sampled currently moves a distance in excess of a first distance threshold with respect to a sampling point, it is detected that an update of the persons to be sampled occurs. Further, after monitoring that the update of the persons to be sampled occurs, a person sampled currently can be re-recognized from a standing region of the person sampled currently. In some embodiments, a position of the standing region of the person sampled currently in the monitoring video may be marked in advance.

In some other embodiments, the monitoring video includes the standing region of all the persons to be sampled. Furthermore, based on the monitoring video, a human figure tracking is performed on all the person to be sampled, and it is determined whether an update of the persons to be sampled occurs according to a movement of the human figure tracking. For example, if it is detected that a distance of all the persons to be sampled moving in a same direction exceeds a second distance threshold, it is detected that the update of the persons to be sampled occurs.

In some embodiments, the aforementioned plurality of video frames are video frames obtained frame by frame from the monitoring video, so that detecting whether the staff person performs the disinfection operation may be analyzed based on the successive video frames in the time dimension, thereby improving the accuracy of the detection.

In some embodiments, the aforementioned plurality of video frames are a plurality of video frames determined based on a preset frame number. For example, as the monitoring video is captured, the number of video frames captured is monitored whether reaches the preset frame number, and if the number of the video frames captured currently is equal to the preset frame number, a current video frame serves as one video frame of the plurality of video frames described above. Further, after the current video frame serves as the one video frame of the plurality of video frames, the number of video frames captured may be cleared, so as to extract a next video frame. In this way, the plurality of video frames may be obtained through frame skipping, so that when detecting whether the staff person performs the disinfection operation, it is possible to avoid recognizing each single video frame, thereby reducing the amount of calculation and improving the calculation efficiency.

In some embodiments, as shown in FIG. 4, detecting whether the staff person performs the disinfection operation based on the plurality of video frames in the first time period in the monitoring video, is implemented as the following steps S1021 to S1022.

In S1021, for each video frame in the plurality of video frames, a detection box of a hand of the staff person and a detection box of the disinfection item are extracted from the video frame.

In some examples, the disinfectant item may be a container with disinfectant solution or disinfectant liquid, and the disinfectant solution or disinfectant liquid may include medical disinfectant ingredients such as ethyl alcohol, hydrogen peroxide, or povidone iodine. It should be understood that the present disclosure does not make specific limitations on the content of the disinfection item itself, as long as it meets the medical needs.

Considering an example in which the disinfectant item is an alcohol bottle, extracting a detection box of the alcohol bottle from the video frame may be implemented as follows: inputting the video frame into the pre-trained alcohol bottle recognition model to obtain a corresponding detection box of the alcohol bottle. It will be noted that the detection box of the disinfection item may be an irregular detection box (for example, the detection box may be drawn along the shape of the disinfection item itself), or a regular detection box (for example, a rectangle detection box including a region of the disinfection item), which is not specifically limited in the present disclosure.

In some examples, considering that the video frame may have hands of the staff person and a non-staff person (such as a person to be sampled), each hand in the video frame may be further recognized when the detection box of the hand of the staff person is extracted, so as to determine the hand of the staff person.

For example, as shown in FIG. 5, step S1021 may be implemented as the following steps S10211 to S10213.

In S10211, a hand object detection is performed on the video frame to obtain a detection box of each hand in at least one hand.

In some examples, the video frame may be input into a pre-trained hand recognition model to obtain a corresponding detection box of the hand. Similarly, the detection box of the hand may be an irregular detection box (for example, the detection box may be drawn along the shape of the hand itself), or a regular detection box (for example, a rectangle detection box including a region of the hand), which is not specifically limited in the present disclosure.

In S10212, it is detected whether the hand is wearing a glove based on the detection box of the hand.

In some examples, step S10212 may be implemented as: based on the detection box of the hand, extracting an image block corresponding to the hand from the video frame; inputting the image block corresponding to the hand into a glove recognition model to obtain a recognition result output from the glove recognition model, where the recognition result is used to indicate whether the hand is wearing the glove.

In S10213, a detection box of a hand wearing a glove is determined as the detection box of the hand of the staff person.

Herein, the aforementioned gloves may be medical plastic gloves or other gloves that the staff person may wear, which are not specifically limited in the present disclosure. It is not difficult to understand that when taking samples from persons to be sampled, the staff person generally needs to wear plastic medical gloves to ensure personal safety. In this way, the accuracy of detection may be improved.

In S1022, it is determined whether the staff person performs the disinfection operation based on a relative position relationship between the detection box of the hand of the staff person and the detection box of the disinfection item.

Considering that the hand of the staff person needs to touch the disinfection item when the staff person performs the disinfection operation, whether the staff person performs the disinfection operation may be detected based on an Intersection over Union (IoU) between the detection box of the hand of the staff person and the detection box of the disinfection item.

For example, as shown in FIG. 6, step S1022 may be implemented as the following steps S10221 to S10223.

In S10221, the Intersection over Union between the detection box of the hand of the staff person and the detection box of the disinfection item is determined.

Here, an Intersection over Union is also called an overlapping ratio. In a case where there exists an intersection between the detection box of the hand of the staff person and the detection box of the disinfection item (that is, there exists an overlapping region), as shown in FIG. 7, an intersection region (shown by the shaded part of (1) in FIG. 7 for details) between the detection box A of the hand of the staff person and the detection box B of the disinfection item has an area S1, and a union region (shown by the shaded part of (2) in FIG. 7 for details) between the detection box A of the hand of the staff person and the detection box B of the disinfection item has an area S2, and a ratio of S1 to S2 (S1/S2) is determined as the Intersection over Union between the detection box of the hand of the staff person and the detection box of the disinfection item.

In some examples, for the convenience of calculation, a ratio of the number of pixels in the intersection region to the number of pixels in the union region may also serve as a corresponding Intersection over Union.

For example, if a position of the detection box of the hand of the staff person is [x1, y1, x2, y2], and a position of the detection box of the disinfection item is [x3, y3, x4, y4], where (x1, y1) represents coordinates of a pixel at an upper-left corner point of the detection box of the hand of the staff person, (x2, y2) represents coordinates of a pixel at a lower-right corner point of the detection box of the hand of the staff person, (x3, y3) represents coordinates of a pixel at an upper-left corner point of the detection box of the disinfection item, and (x4, y4) represents coordinates of a pixel at a lower-right corner point of the detection box of the disinfection item, then the area S1 of the intersection region between the detection box of the hand of the staff person and the detection box of the disinfection item satisfies the following relationship:

$$S1 = |x2 - x3| * |y2 - y3| \qquad \text{Formula (1)}$$

The area S2 of the union region between the detection box of the hand of the staff person and the detection box of the disinfection item satisfies the following relationship:

$$S2 = |x2 - x1| * |y2 - y1| + |x4 - x3| * |y4 - y3| - 2 * S1 \qquad \text{Formula (2)}$$

Furthermore, the Intersection over Union can be obtained based on the ratio of S1 to S2.

In S10222, if the Intersection over Union is greater than or equal to a preset threshold, it is determined that the staff person performs the disinfection operation.

It is not difficult to understand that if the Intersection over Union is greater than or equal to the preset threshold, it means that the hand of the staff person is in contact with the disinfection item, and the staff person performs the disinfection operation (for example, the staff person presses the disinfection item to make the disinfectant solution act on the hand of the staff person to perform disinfecting).

In order to further improve the detection accuracy, in a case where the Intersection over Union is greater than or equal to the preset threshold, a target action detection (such as pressing action detection) may be performed on the video frame, so as to further determine whether the staff person performs the disinfection operation.

In S10223, if the Intersection over Union is less than the preset threshold, it is determined that the staff person does not perform the disinfection operation.

Similarly, if the Intersection over Union is less than the preset threshold, it means that the hand of the staff person has no or less contact with the disinfection item, and the staff person does not perform the disinfection operation.

In S103, in response to detecting that the staff person does not perform the disinfection operation, first warning information is issued.

In some embodiments, the first warning information includes prompt information for reminding a person to be sampled to pay attention to personal safety, so as to remind persons on-site to pay attention to safety in time when the staff person misses the disinfection operation.

In some embodiments, the first warning information includes prompt information for reminding the staff person that he/she has missed a step of the disinfection operation. For example, "WARNING! FAILURE TO DETECT DISINFECTION IN TIME! PLEASE NOTE IF YOU HAVE FINISHED DISINFECTION!" is issued in the form of text or voice, so as to enable the staff person to carry out the disinfection operation upon receipt of the warning information.

In some embodiments, the first warning information includes at least one of identity information of the staff person, violation behavior information of the staff person, work location information of the staff person. In this way, personal information of the staff person who missed the disinfection operation may be recorded. Further, if it is detected that the staff person misses the disinfection operation for many consecutive times, the first warning information will be sent to the management person to assist the management person in their supervision and management.

In some embodiments, if it is detected that the staff person does not perform the disinfection operation within the first time period, the first warning information further includes the monitoring video in the first time period, so that the management person may verify and supervise whether the staff person really missed the disinfection operation.

In some embodiments, the issuing the first warning information may be implemented as: playing the first warning information through a loudspeaker; or displaying the first warning information on a screen at the plaza. It should be understood that the aforementioned manner of issuing the first warning information is only an example, and there may further be other warning manners, such as emitting a beeping sound or warning by vibration, which are not specifically limited in the present disclosure.

In some other embodiments, the issuing the first warning information may also be implemented as: sending the first warning information to a terminal equipment of the staff person; or sending the first warning information to a terminal equipment of the management person; or sending the first warning information to a terminal equipment of the person to be sampled.

Accordingly, if it is necessary to send the first warning information to the terminal equipment of the staff person, management person or person to be sampled, after the above step S101, the terminal equipment of the relevant person may be registered to obtain an authorization to push information, so that a subsequent operation of sending the first warning information can be carried out.

It should be understood that embodiments shown in FIG. 3 will bring at least the following beneficial effects that: through the analysis of the monitoring video, it is detected whether the staff person performs the disinfection operation after the update of the persons to be sampled occurs, and the warning is issued if the staff person does not perform the disinfection operation. In this way, it may be ensured that the staff person will perform a disinfection operation after each sampling (such as nucleic acid sampling) of a person to be sampled, so as to prevent the staff person from sampling multiple persons to be sampled without performing disinfection operations, thereby reducing the risk of cross-infection and improving the efficiency of epidemic prevention and control.

In some embodiments, the staff person may not need to move the disinfection item while performing the disinfection operation. For example, in a nucleic acid sampling scene, the staff person generally only presses a disinfection bottle for disinfection, and will not pick up the disinfection bottle. Therefore, a placement position of the disinfection item may be detected, so as to prevent the disinfection item from being accidentally touched or moved. For example, as shown in FIG. 8, after the above step S101, the method may further include the following steps S201 to S202.

In S201, based on the monitoring video, an initial placement position of the disinfection item is determined and a real-time placement position of the disinfection item is tracked.

Here, the initial position of the disinfection item may be a pre-input position, or may be a placement position of the disinfection item detected when the first person to be sampled is sampled.

In some examples, the aforementioned position may be a position determined based on pixel coordinates, or a position determined by world coordinates obtained by performing coordinate conversion on pixel coordinates. For the manner of the coordinate conversion, refer to the description in step S301 below for details, and will not be described here.

In S202, if a distance between the real-time placement position of the disinfection item and the initial placement position of the disinfection item is greater than or equal to a preset distance, second warning information is issued.

If the above position is a position determined based on pixel coordinates, step S202 may be implemented as: determining first pixel coordinates of a center point of the detection box of the disinfection item when the disinfection item is at the initial position; determining second pixel coordinates of the center point of the detection box of the disinfection item in a current video frame; and issuing the second warning information a distance between the first pixel coordinates and the second pixel coordinates is greater than or equal to a pixel distance threshold. Here, the pixel distance threshold may be determined based on a proportion of the detection box of the disinfection item in the video frame, and/or the resolution of the video frame, which is not specifically limited in the embodiments of the present disclosure.

If the above position is a position determined based on world coordinates, step S202 may be implemented as: determining first world coordinates of a center point of the detection box of the disinfection item when the disinfection item is at the initial position; determining second world coordinates of the center point of the detection box of the disinfection item in a current video frame; and issuing the second warning information a distance between the first world coordinates and the second world coordinates is greater than or equal to a world distance threshold.

In some examples, the second warning information may include prompt information for reminding the person to be sampled or the staff person to pay attention to personal safety. Alternatively, the second warning information may include prompt information for reminding staff that the disinfected item has been moved by mistake. Alternatively, the second warning information may include a monitoring video during which a movement of the disinfection item is detected, so that the management or the staff person can verify and check the false movement of the disinfection item.

In some embodiments, the foregoing manner of issuing the second warning information may refer to the manner of issuing the first warning information. For example, the second warning information may be played through a loudspeaker, displayed on a screen at the plaza, or sent to the terminal equipment of the staff person, management person or person to be sampled. The present disclosure does not specifically limit this.

In some embodiments, when persons to be sampled are sampled, it is considered that a distance between the persons to be sampled may be too short, which is not conducive to epidemic prevention and control. Therefore, the distance between the persons to be sampled may be detected to avoid a situation of persons gathering. For example, as shown in FIG. 9, after step S101, the above method may further include step S301 to step S303.

In S301, pieces of position information of a plurality of persons to be sampled are recognized based on the video frames of the monitoring video.

In some embodiments, location information of a person to be sampled is world coordinates of the person to be sampled.

In some embodiments, as shown in FIG. 10, step S301 may be specifically implemented as the following steps S3011 to S3012.

In S3011, a human body recognition is performed on the monitoring video to obtain pixel coordinates of the plurality of persons to be sampled.

In some examples, step S3011 is implemented as: performing human body recognition on the video frame of the monitoring video, determining a human body detection box of each person to be sampled from the video frame of the monitoring video, and determining pixel coordinates of a center point of each human body detection box as pixel coordinates of a corresponding person to be sampled.

It should be understood that the center point of the human body detection box may be replaced by other positioning points (for example, a midpoint of a bottom edge of the human body detection box, etc.), which is not specifically limited in the embodiments of the present disclosure.

In S3012, world coordinates of the plurality of persons to be sampled are determined based on a conversion from the pixel coordinates to the world coordinates.

Furthermore, world coordinates of each person to be sampled of the plurality of persons to be sampled are determined as position information of the person to be sampled.

In addition, in order to facilitate the understanding of the solution, a method of coordinate conversion is exemplarily given below for realizing mutual conversion between pixel coordinates, image coordinates, camera coordinates, and world coordinates, for example, a conversion from pixel coordinates to world coordinates.

In some examples, converting pixel coordinates to world coordinates may be achieved through consecutive conversions of multiple coordinate systems. For example, a pixel coordinate system is converted to an image coordinate system, the image coordinate system is converted to a camera coordinate system, and the camera coordinate system is converted to a world coordinate system.

Here, the pixel coordinate system is a coordinate system with the upper-left corner of an image (e.g., a video frame) as the origin, the horizontal axis parallel to the bottom edge of the image, and the vertical axis parallel to the height of the image; the image coordinate system is a coordinate system with the center of the image as the coordinate origin, the horizontal axis parallel to the bottom edge of the image, and the vertical axis parallel to the height of the image; the camera coordinate system is a three-dimensional coordinate system centered on the photo-center of a camera; and the world coordinate system is an absolute coordinate system of the objective three-dimensional world.

If it is assumed that world coordinates of a point to be measured in the world coordinate system are (X, Y, Z), and camera coordinates of this point to be measured in the camera coordinate system are (Xc, Yc, Zc), camera coordinates thereof in the image coordinate system are (x, y), and pixel coordinates thereof in the pixel coordinate system are (u, v), then the above world coordinates, camera coordinates, image coordinates, and pixel coordinates satisfy the following conversion relations:

(1) Conversion Relationship Between World Coordinates and Camera Coordinates

Both the world coordinate system and the camera coordinate system are three-dimensional coordinate systems, but have different coordinate representations. Therefore, there exists a rigid body transformation relationship between the world coordinate system and the camera coordinate system. World coordinates in the world coordinate system can be converted into camera coordinates in the camera coordinate system through a rotation matrix and a translation matrix.

For example, the world coordinates (X, Y, Z) and camera coordinates (Xc, Yc, Zc) of the point to be measured satisfy the following relationship:

$$\begin{bmatrix} Xc \\ Yc \\ Zc \\ 1 \end{bmatrix} = \begin{bmatrix} R & t \\ 0^T & 1 \end{bmatrix} \begin{bmatrix} X \\ Y \\ Z \\ 1 \end{bmatrix} \qquad \text{Formula (3)}$$

where, R is a 3 by 3 (3×3) matrix, and t is a 3 by 1 (3×1) matrix. The rigid body transformation between the world coordinate system and the camera coordinate system can be realized based on Formula (3).

(2) Conversion Relationship Between Camera Coordinates and Image Coordinates

There exists a perspective projection transformation relationship between the camera coordinate system and the image coordinate system, so the camera coordinates of the point to be measured can be converted into the image coordinates based on the perspective projection transformation relationship.

For example, the camera coordinates (Xc, Yc, Zc) and image coordinates (x, y) of the point to be measured satisfy the following relationship:

$$\frac{x}{f} = \frac{Xc}{Zc} \qquad \text{Formula (4)}$$

$$\frac{y}{f} = \frac{Yc}{Zc} \qquad \text{Formula (5)}$$

The above Formula (4) and Formula (5) may also be expressed as the form shown in Formula (6):

$$Zc \begin{bmatrix} X \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} Xc \\ Yc \\ Zc \\ 1 \end{bmatrix} \qquad \text{Formula (6)}$$

where, f is used to represent the focal length of the camera device, and Zc is used to represent amount of position change determined based on extrinsic parameters of the camera device.

In some examples, Zc satisfies the following relationship:

$$Zc = \frac{f\,h\cos\varphi\cos\theta}{x\cos\varnothing} \qquad \text{Formula (7)}$$

where, h is used to represent the height of the camera device, and (Ø, θ, φ) is used to represent the attitude angle of the camera device.

(3) Conversion Relationship Between Image Coordinates and Pixel Coordinates

There exists an affine transformation relationship between the image coordinate system and the pixel coordinate system. Units of x and y in the image coordinates (x, y) are millimeters (mm), while u and v in the pixel coordinates (u, v) are used to refer to coordinates of a specific pixel point.

Therefore, the image coordinates (x, y) and pixel coordinates (u, v) of the point to be measured satisfy the following relationship:

$$u = \frac{x}{dx} + u_0 \qquad \text{Formula (8)}$$

$$v = \frac{y}{dy} + v_0 \qquad \text{Formula (9)}$$

The above Formula (8) and Formula (9) may also be expressed as the form shown in Formula (10):

$$\begin{bmatrix} u \\ v \\ 1 \end{bmatrix} = \begin{bmatrix} \dfrac{1}{dx} & 0 & u_0 \\ 0 & \dfrac{1}{dy} & v_0 \\ 0 & 0 & 1 \end{bmatrix} \begin{bmatrix} x \\ y \\ 1 \end{bmatrix} \qquad \text{Formula (10)}$$

where, dx is used to represent a physical distance in millimeters for each pixel on the horizontal axis, dy is used to represent a physical distance in millimeters for each pixel on the vertical axis, and (u0, v0) represent coordinates of the origin in the image coordinate system in terms of the pixel coordinate system.

To sum up, pieces of location information of multiple persons to be sampled may be recognized based on conversions of coordinates.

In S302, a distance between two adjacent persons to be sampled is determined based on the pieces of position information of the plurality of persons to be sampled.

For example, if world coordinates of the first person to be sampled are (A1, B1, C1), and world coordinates of the second person to be sampled are (A2, B2, C2), then a distance D between the first person to be sampled and the second person to be sampled satisfies the following relationship:

$$D = \sqrt{(A2 - A1)^2 + (B2 - B1)^2 + (C2 - C1)^2} \qquad \text{Formula (11)}$$

In S303, if the distance between the two adjacent persons to be sampled is less than or equal to a preset distance, it is determined that the two adjacent persons to be sampled exhibit a violation behavior.

It should be understood that if the distance between the two adjacent persons to be sampled is less than or equal to the preset distance, it means that the distance between the two persons to be sampled is too short; and if there exists a person among them who is infected with an infectious disease, it may lead to the spreading of the disease, which is not conducive to epidemic prevention and control. Therefore, if the distance between the two adjacent persons to be sampled is less than or equal to a preset distance, it is determined that the two adjacent persons to be sampled exhibit a violation behavior.

Furthermore, if it is detected that a person to be sampled exhibits violation behaviors many times, a corresponding warning may be issued. As shown in FIG. 11, the method may further include step S304 after step S303.

In S304, third warning information is issued after determining that the two adjacent persons to be sampled exhibit the violation behavior.

In some embodiments, the issuing the third warning information may be implemented as: playing the third warning information through a loudspeaker; or displaying the third warning information on a screen in the plaza. It should be understood that the aforementioned manner of issuing the third warning information is only an example, and there may further be other warning manners, such as emitting a beeping sound or warning by vibration, which are not specifically limited in the present disclosure.

In some examples, the issuing the third warning information may be implemented as: sending the third warning information to a terminal equipment of the staff person; or sending the third warning information to a terminal equipment of the management person; or sending third warning information to a person to be sampled (such as a person to be sampled who exhibits a violation behavior).

In some embodiments, the third warning information may include warning information for reminding a person to be sampled whose number of violations behaviors is greater than or equal to a preset number to regulate his/her personal behavior; alternatively, the third warning information may include warning information for reminding relevant persons (such as persons to be sampled, the staff person or the management person) pay attention to safety and protection; alternatively, the third warning information may include at least one of human face information of a person to be sampled who exhibits a violation behavior, identity information of the person to be sampled who exhibits the violation behavior, violation behavior information (such as the content of a violation and/or the number of violations) of the person to be sampled who exhibits the violation behavior, or location information of the person to be sampled who exhibits the violation behavior. It should be understood that the present disclosure does not limit the specific content of the third warning information.

In some embodiments, as shown in (1) in FIG. 12, the issuing the third warning information may be implemented as the following steps S3041a to S3042a.

In S3041a, the number of violation behaviors of each person to be sampled is recorded.

In some examples, step S3041a is implemented as: performing a human face recognition on a person to be sampled who exhibits a violation behavior to obtain target human face information of the person to be sampled who exhibits the violation behavior; finding face information matching this target face information from the pre-stored registration information; and adding one to the number of violations corresponding to the human face information matching this target face information. The registration information includes: pre-stored pieces of human face information, and information associated with each piece of human face information in the pre-stored pieces of human face information, such as information of a terminal equipment, identity information, account information, violation behavior information or violation frequency information.

In S3042a, the third warning information is issued if the number of violation behaviors of the person to be sampled is greater than or equal to the preset number.

In this way, if it is detected that the person to be sampled exhibits violation behaviors many times, the warning may be issued. It should be understood that if the number of violations of a person to be sampled is greater than or equal to the preset number, it means that this person to be sampled has a high probability of actively participating in the gathering of persons, so a timely warning is required to improve the safety of epidemic prevention and control. In addition, false warnings caused by accidental situations (such as passing by other persons to be sampled) may be avoided, thereby improving the detection accuracy.

In some other embodiments, as shown in (2) in FIG. 12, the issuing the third warning information may be implemented as the following steps S3041b to S3042b.

In S3041b, a human face recognition is performed on a person to be sampled who exhibits a violation behavior to obtain target human face information of the person to be sampled who exhibits the violation behavior.

In some examples, step S3041b may be implemented as: performing the human face recognition on a human body detection box of the person to be sampled who exhibits the violation behavior, and extracting a human face region of the person to be sampled who exhibits the violation behavior; and performing a feature recognition on the human face region of the person to be sampled who exhibits the violation behavior to obtain the target human face information of the person to be sampled who exhibits the violation behavior, and saving the target human face information.

In S3042b, the third warning information is sent to a terminal equipment bound with the target human face information based on pre-stored registration information.

In some examples, the pre-stored registration information includes pre-stored pieces of human face information, and information of a terminal equipment bound with each piece of human face information of the pre-stored pieces of human face information.

In some examples, sending the third warning information to the terminal equipment bound with the target human face information, includes: sending the third warning information for reminding the person to be sampled who exhibits the violation behavior to regulate his/her personal behavior to the terminal equipment bound with the target human face information.

In some other embodiments, as shown in (3) in FIG. 12, the issuing the third warning information may be implemented as the following step S3041c.

In S3041c, the third warning information is sent to the management person.

In some embodiments, when the third warning information is sent to the management person, the third warning information may include at least one of human face information of a person to be sampled who exhibits a violation behavior, identity information of the person to be sampled who exhibits the violation behavior, violation behavior information (such as the content of a violation and/or the number of violations) of the person to be sampled who exhibits the violation behavior, or location information of the person to be sampled who exhibits the violation behavior. In this way, management person can conduct on-site supervision and management in a timely manner, and separate the person to be sampled who exhibits the violation behavior from other persons.

In some embodiments, before step S101 or step S102 is performed, a human face registration of a person to be sampled may be performed, and human face information of the person to be sampled and information associated with the human face information (such as information of a terminal equipment, identity information, account information, violation behavior information or violation frequency information) may be saved. In some embodiments, it may be determined whether the person to be sampled is a person with a red code or yellow code or another risk person based on the human face information. In some embodiments, the human face information may be bound to an account or a terminal equipment.

In some embodiments, the human face registration of the person to be sampled may be realized based on the monitoring video. For example, a human face of a person in the monitoring region is recognized from the monitoring video; an image of the human face is intercepted based on key points of the human face (such as key points of the eyes of the human face, a key point of the nose, or key points of both corners of the mouth); based on human face information of the intercepted image of the human face and pieces of human face information of registered persons in the storage device, it is determined whether the human face information corresponding to the intercepted image of the human face has been registered; and if the intercepted image of the human face corresponding to the human face information is not registered, the human face information corresponding to the intercepted image of the human face will be stored in the storage device. Further, if it is detected that the intercepted image of the human face does not meet image quality requirements (for example, the number of pixels of the image of the human face exceeds the pixel number threshold, and/or a proportion of occlusions in the image of the human face exceeds an occlusion proportion threshold), the human face of the person in the monitoring region will be re-recognized.

In some embodiments, the human face registration of the person to be sampled may be realized based on a terminal equipment. For example, the person to be sampled is reminded to register his/her human face information through the terminal equipment; in response to detecting personal information input by the person to be sampled through the terminal equipment, it is determined whether the human face information of the person to be sampled has been registered; and an image of the human face of the person to be sampled is obtained through the terminal equipment or a shooting device (i.e., the camera device), in response to that the human face information of the person to be sampled has not been registered, and the human face information corresponding to the obtained image of the human face is stored in the storage device. Further, if it is detected that the intercepted image of the human face does not meet image quality requirements (for example, the number of pixels of the image of the human face exceeds the pixel number threshold, and/or a proportion of occlusions in the image of the human face exceeds an occlusion proportion threshold), the human face of the person in the monitoring region will be re-recognized.

In some embodiments, considering whether wearing a mask is also important for epidemic prevention and control, it is also possible to recognize whether a person to be sampled is wearing a mask. The above method may further include the following steps: performing a human face recognition on the persons to be sampled based on the monitoring video, and extracting an image of a human face of each person to be sampled from the monitoring video based on a recognition result; performing a mask recognition based on the image of the human face of each person to be sampled, so as to determine whether there exists a person to be sampled who is not wearing a mask in a monitoring region displayed by the monitoring video; and if there exists the person to be sampled not wearing the mask, issuing fourth warning information. In some embodiments, the fourth warning information is used to remind other persons in the monitoring region to pay attention to safety. In some embodiments, the fourth warning information is used to notify the management person of an existence of a person who is not wearing a mask in the monitoring region, so that the management person may carry out on-site management. In some embodiments, the human face recognition may be performed on a person to be sampled who is not wearing a mask to obtain human face information of the person to be sampled who is not wearing the mask, and based on an account or terminal equipment bound to the human face information of the person to be sampled who is not wearing the mask, the fourth warning information is sent to the account or terminal equipment of the person to be sampled who is not wearing the mask.

Further, considering that a person to be sampled will take off his/her mask when sampling (such as nucleic acid sampling), it is possible to recognize whether a person to be sampled is wearing a mask or not only for those persons to be sampled who have not yet been sampled in the monitoring video, so as to improve an accuracy of recognizing whether a person is wearing a mask or not.

In some embodiments, considering that detection of body temperature also plays an important role in epidemic prevention and control, in a case where the management system for epidemic detection includes a temperature measuring device capable of infrared imaging, the above method further includes: obtaining a color image of a person to be sampled captured by the shooting device, and an infrared image captured by the temperature measuring device; based on the color image, performing a human face recognition on the person to be sampled, and locating a position of the forehead of the person to be sampled in the color image; based on a mapping relationship between the color image and the infrared image, locating a position of the forehead of the person to be sampled in the infrared image; based on an average value of pixels of the position of the forehead of the person to be sampled in the infrared image, determining a temperature of the forehead of the person to be sampled; and if it is detected that the temperature of the person to be sampled exceeds a temperature threshold, issuing fifth warning information. In some embodiments, the fifth warning information is used to remind other persons in the monitoring region to pay attention to safety. In some embodiments, the fifth warning information is used to notify the management person of an existence of a person with high body temperature in the monitoring region, so that the management person may perform on-site management. In some embodiments, the human face recognition may be performed on a person to be sampled whose body temperature exceeds the temperature threshold to obtain human face information of the person to be sampled whose body temperature exceeds the temperature threshold, and based on an account or terminal equipment bound to the human face registration information, the fifth warning information is sent to the terminal equipment of the person to be sampled whose temperature exceeds the temperature threshold.

The foregoing descriptions mainly introduce the solutions provided by the embodiments of the present disclosure from perspective of method. In order to achieve the above functions, corresponding hardware structures and/or software modules for performing various functions are provided. A person skilled in the art will be easy to realize that, by combining modules and algorithm steps of various examples described in the embodiments disclosed herein, the embodiments of the present disclosure can be implemented through hardware or a combination of hardware and computer software. Whether a certain function is performed by the hardware or a way of driving hardware by the computer software depends on a specific application and a design constraint of a technical scheme. A skilled person may use different methods for each specific application to implement the described functions, but such implementation should not be considered beyond the scope of the present disclosure.

Figure 13:
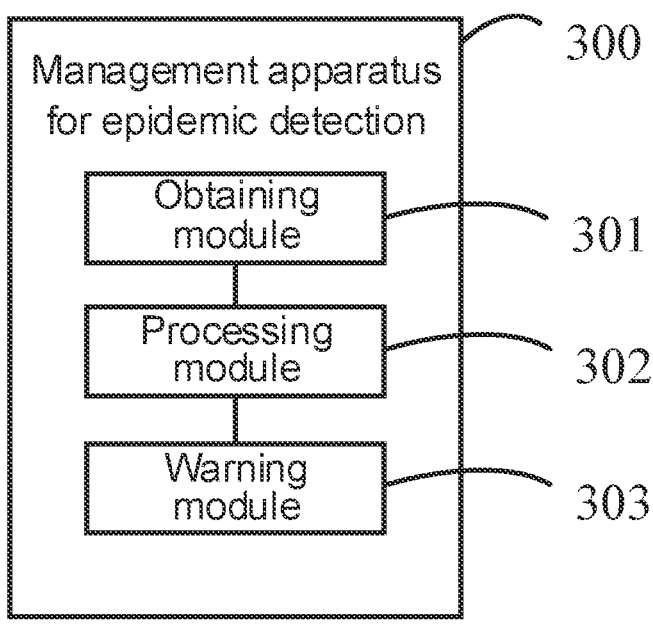
FIG. 13 is a structural diagram of a management apparatus for epidemic detection, in accordance with some embodiments.

As shown in FIG. 13, embodiments of the present disclosure provide a management apparatus for epidemic detection, used for implementing the management method for epidemic detection shown in FIG. 4. The management device 300 for epidemic detection includes an obtaining module 301, a processing module 302 and a warning module 303.

The obtaining module 301 is used to obtain a monitoring video captured in real time at an epidemic detection site.

The processing module 302 is used to, in response to monitoring that an update of persons to be sampled occurs, detect whether a staff person performs a disinfection operation based on a plurality of video frames in a first time period in the monitoring video, where the first time period is a time period between a moment when the update of the persons to be sampled is monitored last time and a moment when the update of the persons to be sampled is monitored currently.

The warning module 303 is used to, in response to detecting that the staff person does not perform the disinfection operation, issue first warning information.

In some embodiments, the processing module 302 is used to: for each video frame in the plurality of video frames, extract a detection box of a hand of the staff person and a detection box of a disinfection item from the video frame; and determine whether the staff person performs the disinfection operation based on a relative position relationship between the detection box of the hand of the staff person and the detection box of the disinfection item.

In some embodiments, the processing module 302 is used to: determine an Intersection over Union between the detection box of the hand of the staff person and the detection box of the disinfection item; if the Intersection over Union is greater than or equal to a preset threshold, determine that the staff person performs the disinfection operation; and if the Intersection over Union is less than the preset threshold, determine that the staff person does not perform the disinfection operation.

In some embodiments, the processing module 302 is used to: perform a hand object detection on the video frame to obtain a detection box of each hand in at least one hand; detect whether the hand is wearing a glove based on the detection box of the hand; and determine a detection box of a hand wearing a glove as the detection box of the hand of the staff person.

In some embodiments, the processing module 302 is used to: extract an image block corresponding to the hand from the video frame based on the detection box of the hand; and input the image block corresponding to the hand into a glove recognition model to obtain a recognition result output by the glove recognition model, where the recognition result is used to indicate whether the hand is wearing the glove.

In some embodiments, the warning module 303 is used to: play the first warning information through a loudspeaker; or send the first warning information to a terminal equipment of a management person, where the first warning information includes at least one of identity information of the staff person, violation behavior information of the staff person, work location information of the staff person.

In some embodiments, the processing module 302 is further used to, based on the monitoring video, determine an initial placement position of the disinfection item, and track a real-time placement position of the disinfection item.

In some embodiments, the warning module 303 is further used to, if a distance between the real-time placement position of the disinfection item and the initial placement position of the disinfection item is greater than or equal to a preset distance, issue second warning information.

In some embodiments, the processing module 302 is further used to: recognize pieces of position information of a plurality of persons to be sampled based on the video frames of the monitoring video; determine a distance between two adjacent persons to be sampled based on the pieces of position information of the plurality of persons to be sampled; and if the distance between the two adjacent persons to be sampled is less than or equal to a preset distance, determine that the two adjacent persons to be sampled exhibit a violation behavior.

In some embodiments, position information of a person to be sampled is world coordinates of the person to be sampled. The processing module 302 is used to: perform a human body recognition on the monitoring video to obtain pixel coordinates of the plurality of persons to be sampled; and determine world coordinates of the plurality of persons to be sampled, based on a conversion from the pixel coordinates to the world coordinates.

In some embodiments, the warning module 303 is further used to issue third warning information, after determining that the two adjacent persons to be sampled exhibit the violation behavior.

In some embodiments, the processing module 302 is further used to record the number of violation behaviors of each person to be sampled.

In some embodiments, the warning module 303 is used to issue the third warning information, if the number of violation behaviors of the person to be sampled is greater than or equal to a preset number.

In some embodiments, the processing module 302 is further used to: perform a human face recognition on a person to be sampled with a violation behavior to obtain target human face information of the person to be sampled with the violation behavior. The warning module 303 is used to: send the third warning information to a terminal equipment bound with the target human face information based on pre-stored registration information, where the pre-stored registration information includes pre-stored pieces of human face information and information of a terminal equipment bound with each of the pre-stored pieces of human face information.

In some embodiments, the warning module 303 is used to: send the third warning information to the management person, where the third warning information includes at least one of: human face information of a person to be sampled with the violation behavior, identity information of the person to be sampled with the violation behavior, violation behavior information of the person to be sampled with the violation behavior, or position information of the person to be sampled with the violation behavior.

It will be noted that, the division of the modules in FIG. 13 is schematic, and is only a logical function division, and there may be other ways to divide the modules in actual implementation. For example, two or more functions may be integrated into one processing module. The integrated module may be implemented in the form of hardware, or may be implemented in the form of software functional modules.

Figure 14:
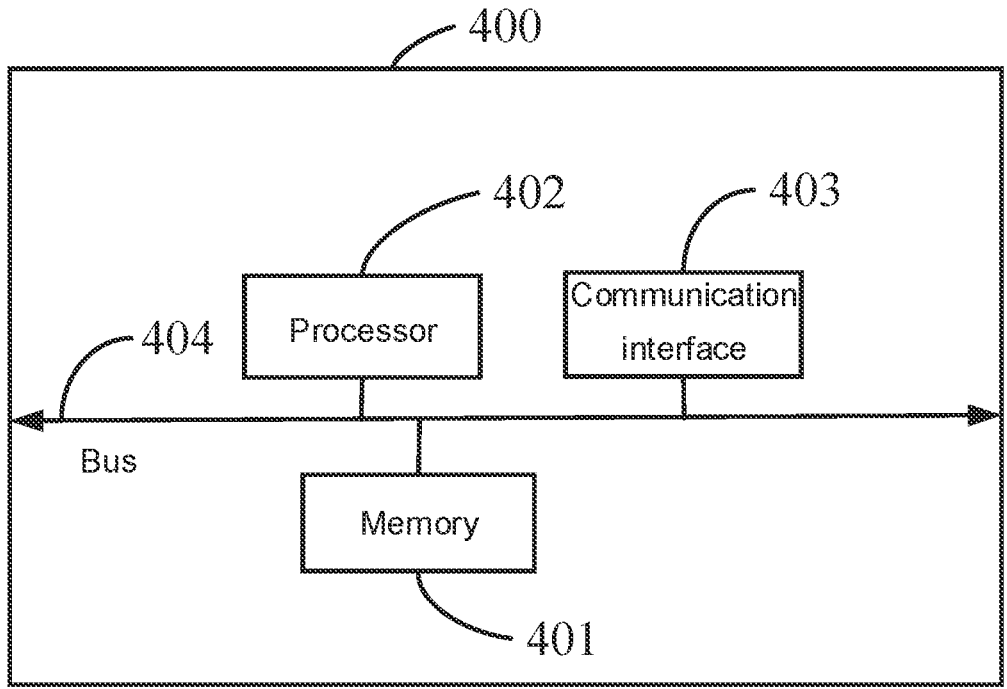
FIG. 14 is a structural diagram of an electronic device, in accordance with some embodiments.

In addition, embodiments of the present disclosure provide an electronic device involved in the foregoing embodiments. As shown in FIG. 14, the electronic device 400 includes a processor 402 and a bus 404. In some embodiments, the electronic device may further include a memory 401; in some embodiments, the electronic device may further include a communication interface 403.

The processor 402 can implement or execute various illustrative logical blocks, modules and circuits described in conjunction with the present disclosure. The processor 402 may be a central processing unit, a general-purpose processor, a digital signal processor, an application specific integrated circuit, a field programmable gate array or any other programmable logic device, a transistor logic device, a hardware component, or any combination thereof. The processor can implement or execute various illustrative logical blocks, modules and circuits described in conjunction with the present disclosure. The processor 402 may also be a combination capable of implementing computing functions, for example, a combination of one or more microprocessors, or a combination of a digital signal processor (DSP) and a microprocessor.

The communication interface 403 is used to connect with other devices through a communication network. The communication network may be an Ethernet, a wireless access network, a wireless local area network (WLAN), or the like.

The memory 401 may be, but is not limited to, a read-only memory (ROM) or a static storage device of any other type capable of storing static information and instructions, a random access memory (RAM) or a dynamic storage device of any other type capable of storing information and instructions, or an electrically erasable programmable read-only memory (EEPROM), a magnetic disk storage medium or any other magnetic disk storage device, or any other medium capable of being used to carry or store desired program codes and capable of being accessed by a computer, where the desired program codes have instructions or are in the form of data structure.

As a possible implementation, the memory 401 may exist independently of the processor 402, and the memory 401 may be connected to the processor 402 through the bus 404, and is used for storing instructions or program codes. Calling and executing the instructions or program code stored in the memory 401, the processor 402 is capable of realizing the management method for epidemic detection provided by embodiments of the present disclosure.

As another possible implementation, the memory 401 may be integrated with the processor 402.

The bus 404 may be an extended industry standard architecture (EISA) bus or the like. Buses 404 may be divided into address buses, data buses, and control buses. For ease of representation, only a single thick line is used in FIG. 14 to represent the bus, but it does not mean that there is only one bus or one type of bus.

From description of the above embodiments, those skilled in the art will clearly understand that, for convenience and brevity of description, the above division of various functional module is only an illustrative example. In practical applications, the above functions may be allocated to different functional modules as needed, that is, the internal structure of the electronic device may be divided into different functional modules to accomplish all or some of the functions described above.

Some embodiments of the present disclosure provide a computer-readable storage medium (for example, a non-transitory computer-readable storage medium), the computer-readable storage medium stores computer program instructions that, when run on a computer (e.g., the electronic device or the management device for epidemic detection), enable the computer to perform the management method for epidemic detection as described in any of the above embodiments.

For example, the computer-readable storage medium includes, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM), a card, a stick or a key driver). The various computer-readable storage media described in present disclosure may represent one or more devices and/or other machine-readable storage media for storing information. The term "machine-readable storage medium" may include, but is not limited to, wireless channels and various other media capable of storing, containing, and/or carrying instructions and/or data.

Some embodiments of the present disclosure provide a computer program product. For example, the computer program product is stored on a non-transitory computer-readable storage medium. The computer program product includes computer program instructions that, when executed on a computer (e.g., the electronic device or the management device for epidemic detection), enable the computer to perform the management method for epidemic detection as described in any of the above embodiments.

Some embodiments of the present disclosure provide a computer program. The computer program, when executed on a computer (e.g., the aforementioned electronic device), enables the computer to perform the management method for epidemic detection as described in any of the above embodiments.

Beneficial effects of the non-transitory computer-readable storage medium, computer program product and computer program described above are the same as the beneficial effects of the management method for epidemic detection described in some of the above embodiments, which will not be repeated here.

Although the present disclosure is described herein in conjunction with various embodiments, other variations of the disclosed embodiments may be understood and realized by those skilled in the art by viewing the accompanying drawings, the disclosed content, and the claims as provided, during the implementation of the present disclosure for which protection is claimed. In the claims, the word "comprise/comprises/comprising" does not exclude other components or steps, and "a/an" or "one" does not exclude a plurality. A single processor or other unit may fulfill functions of several items recited in the claims. A fact that certain measures are documented in different dependent claims from each other does not mean that these measures cannot be combined to exert a good effect.

Although the present disclosure is described in conjunction with specific features and embodiments thereof, it will be apparent that various modifications and combinations can be made thereto without departing from the spirit and scope of the present disclosure. Accordingly, the specification and drawings herein are merely illustrative of the present disclosure as defined by the claims as provided and are deemed to cover any and all modifications, variations, combinations or equivalents within the scope of the present disclosure. Obviously, those skilled in the art can make various changes and modifications to the present disclosure without departing from the spirit and scope of the present disclosure. In this way, if these modifications and variations of the present disclosure fall within the scope of the claims of the present disclosure and their equivalent technologies, the present disclosure is also intended to include these modifications and variations.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure shall be subject to the protection scope of the claims.

What is claimed is:

1. A management method for epidemic detection applied to a management system for epidemic detection, the management system for epidemic detection including a camera device, a processing device, and a warning device; the method comprising:

obtaining, by the camera device, a monitoring video captured in real time at an epidemic detection site;

in response to monitoring that an update of persons to be sampled occurs, detecting, by the processing device, whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently; and in response to detecting that the staff person does not perform the disinfection operation, issuing, by the warning device, first warning information;

wherein detecting, by the processing device, whether the staff person performs the disinfection operation based on the plurality of video frames in the first time period in the monitoring video, includes:

for each video frame in the plurality of video frames, extracting, by the processing device, a detection box of a hand of the staff person and a detection box of a disinfection item from the video frame; and determining, by the processing device, whether the staff person performs the disinfection operation based on a relative position relationship between the detection box of the hand of the staff person and the detection box of the disinfection item.

2. The method according to claim 1, wherein the first warning information includes at least one of identity information of the staff person, violation behavior information of the staff person, or work location information of the staff person.

3. The method according to claim 1, wherein issuing the first warning information, includes:

playing the first warning information through a loudspeaker; or sending the first warning information to a terminal equipment of a management person.

4. The method according to claim 1, wherein the method further comprises:

based on the monitoring video, determining an initial placement position of the disinfection item, and tracking a real-time placement position of the disinfection item; and if a distance between the real-time placement position of the disinfection item and the initial placement position of the disinfection item is greater than or equal to a first preset distance, issuing second warning information.

5. The method according to claim 1, wherein the method further comprises:

recognizing pieces of position information of a plurality of persons to be sampled based on the video frames of the monitoring video;

determining a distance between two adjacent persons to be sampled based on the pieces of position information of the plurality of persons to be sampled; and if the distance between the two adjacent persons to be sampled is less than or equal to a second preset distance, determining that the two adjacent persons to be sampled exhibit a violation behavior.

6. The method according to claim 5, wherein a piece of position information of each person to be sampled of the plurality of persons to be sampled is world coordinates of the person to be sampled; recognizing the pieces of position information of the plurality of persons to be sampled based on the video frames of the monitoring video, includes:

performing a human body recognition on the monitoring video to obtain pixel coordinates of the plurality of persons to be sampled; and determining world coordinates of the plurality of persons to be sampled, based on a conversion from the pixel coordinates to the world coordinates.

7. The method according to claim 5, wherein the method further comprises:

issuing third warning information, after determining that the two adjacent persons to be sampled exhibit the violation behavior.

8. The method according to claim 7, wherein issuing the third warning information, includes:

recording a number of violation behaviors of each person to be sampled; and issuing the third warning information, if the number of violation behaviors of the person to be sampled is greater than or equal to a preset number.

9. The method according to claim 7, wherein issuing the third warning information, includes:

performing a human face recognition on a person to be sampled with a violation behavior to obtain target human face information of the person to be sampled with the violation behavior; and sending the third warning information to a terminal equipment bound with the target human face information based on pre-stored registration information, the pre-stored registration information including pre-stored pieces of human face information and information of a terminal equipment bound with each of the pre-stored pieces of human face information.

10. The method according to claim 9, wherein performing the human face recognition on the person to be sampled with the violation behavior to obtain the target human face information of the person to be sampled with the violation behavior, includes:

performing the human face recognition on a human body detection box of the person to be sampled with the violation behavior, and extracting a human face region of the person to be sampled with the violation behavior; and performing a feature recognition on the human face region of the person to be sampled with the violation behavior to obtain the target human face information of the person to be sampled with the violation behavior, and saving the target human face information.

11. The method according to claim 7, wherein issuing the third warning information, includes:

sending the third warning information to a management person, wherein the third warning information includes at least one of: human face information of a person to be sampled with the violation behavior, identity information of the person to be sampled with the violation behavior, violation behavior information of the person to be sampled with the violation behavior, or position information of the person to be sampled with the violation behavior.

12. A non-transitory computer-readable storage medium, having stored computer instructions that, when run on a computer, cause the computer to execute the management method for epidemic detection according to claim 1.

13. The method according to claim 1, wherein the method further comprises:

performing a human face recognition on the persons to be sampled based on the monitoring video, and extracting an image of a human face of each person to be sampled from the monitoring video based on a recognition result;

performing a mask recognition based on the image of the human face of each person to be sampled to determine whether there exists a person to be sampled who is not wearing a mask in a monitoring region displayed by the monitoring video; and if there exists the person to be sampled not wearing the mask, issuing fourth warning information.

14. The method according to claim 1, wherein the method further comprises:

obtaining a color image and an infrared image of a person to be sampled;

based on the color image, performing a human face recognition on the person to be sampled, and locating a position of a forehead of the person to be sampled in the color image;

based on a mapping relationship between the color image and the infrared image, locating a position of the forehead of the person to be sampled in the infrared image;

based on an average value of pixels of the position of the forehead of the person to be sampled in the infrared image, determining a temperature of the forehead of the person to be sampled; and if it is detected that the temperature of the person to be sampled exceeds a temperature threshold, issuing fifth warning information.

15. The method according to claim 1, wherein determining whether the staff person performs the disinfection operation based on the relative position relationship between the detection box of the hand of the staff person and the detection box of the disinfection item, includes:

determining an Intersection over Union between the detection box of the hand of the staff person and the detection box of the disinfection item;

if the Intersection over Union is greater than or equal to a preset threshold, determining that the staff person performs the disinfection operation; and if the Intersection over Union is less than the preset threshold, determining that the staff person does not perform the disinfection operation.

16. The method according to claim 1, wherein extracting the detection box of the hand of the staff person from the video frame, includes:

performing a hand object detection on the video frame to obtain a detection box of each hand in at least one hand;

detecting whether the hand is wearing a glove based on the detection box of the hand; and determining a detection box of a hand wearing a glove as the detection box of the hand of the staff person.

17. The method according to claim 16, wherein detecting whether the hand is wearing the glove based on the detection box of the hand, includes:

extracting an image block corresponding to the hand from the video frame based on the detection box of the hand; and inputting the image block corresponding to the hand into a glove recognition model to obtain a recognition result output by the glove recognition model, the recognition result being used to indicate whether the hand is wearing the glove.

18. An electronic device, comprising: a processor and a memory for storing instructions executable by the processor, wherein the processor is configured to execute the instructions to cause the electronic device to perform:

obtaining a monitoring video captured in real time at an epidemic detection site;

in response to monitoring that an update of persons to be sampled occurs, detecting whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently; and in response to detecting that the staff person does not perform the disinfection operation, issuing first warning information;

wherein detecting whether the staff person performs the disinfection operation based on the plurality of video frames in the first time period in the monitoring video, includes:

for each video frame in the plurality of video frames, extracting a detection box of a hand of the staff person and a detection box of a disinfection item from the video frame; and determining whether the staff person performs the disinfection operation based on a relative position relationship between the detection box of the hand of the staff person and the detection box of the disinfection item.

19. A management system for epidemic detection, the system comprising:

a camera device, configured to generate a monitoring video captured in real time at an epidemic detection site, and send data of the generated monitoring video to a processing device having a communication connection therewith;

the processing device, configured to: in response to monitoring that an update of persons to be sampled occurs, detect whether a staff person performs a disinfection operation based on a plurality of video frames in a first time period in the monitoring video, the first time period being a time period between a moment when the update of the persons to be sampled is monitored last time and a moment when the update of the persons to be sampled is monitored currently; and a warning device, configured to, in response to detecting that the staff person does not perform the disinfection operation, issue first warning information;

wherein the processing device is further configured to:

for each video frame in the plurality of video frames, extract a detection box of a hand of the staff person and a detection box of a disinfection item from the video frame; and determine whether the staff person performs the disinfection operation based on a relative position relationship between the detection box of the hand of the staff person and the detection box of the disinfection item.

* * * * *